US009818063B2

(12) United States Patent
Joshi et al.

(10) Patent No.: US 9,818,063 B2
(45) Date of Patent: Nov. 14, 2017

(54) FORECASTING INTEREST IN AN OBJECT OVER A FUTURE PERIOD OF TIME USING A THREE-STAGE TIME-SERIES ANALYSIS PROCESS

(71) Applicant: SAS Institute Inc., Cary, NC (US)

(72) Inventors: Kalyan Joshi, Pune (IN); Nitzi Roehl, Wellington, FL (US); Yung-Hsin (Alex) Chien, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/233,400

(22) Filed: Aug. 10, 2016

(65) Prior Publication Data

US 2017/0061296 A1     Mar. 2, 2017

Related U.S. Application Data

(60) Provisional application No. 62/212,542, filed on Aug. 31, 2015, provisional application No. 62/219,191, filed on Sep. 16, 2015, provisional application No. 62/279,443, filed on Jan. 15, 2016.

(51) Int. Cl.
G06N 5/04     (2006.01)

(52) U.S. Cl.
CPC .................. *G06N 5/04* (2013.01)

(58) Field of Classification Search
None
See application file for complete search history.

(56) References Cited

U.S. PATENT DOCUMENTS

| 6,594,622 | B2 | 7/2003 | Srivastava et al. |
| 8,112,303 | B2 | 2/2012 | Eglen |
| 8,200,454 | B2 | 6/2012 | Dorneich |
| 8,554,699 | B2 | 10/2013 | Ruhl et al. |
| 8,571,915 | B1 | 10/2013 | Wong |

(Continued)

OTHER PUBLICATIONS

Alper et al. Moving holidays and seasonal adjustment: the case of Turkey. Rev Middle East Econ. Fin., 2004, vol. 2, No. 3, 203-209.*
Loonen. Improving the baseline forecast performance. Eindhoven, Aug. 2010.*

(Continued)

*Primary Examiner* — Lut Wong
*Assistant Examiner* — Robert Bejcek, II
(74) *Attorney, Agent, or Firm* — Kilpatrick Townsend & Stockton LLP

(57) ABSTRACT

Information related to a time series can be predicted. For example, a repetitive characteristic of the time series can be determined by analyzing the time series for a pattern that repeats over a predetermined time period. An adjusted time series can be generated by removing the repetitive characteristic from the time series. An effect of a moving event on the adjusted time series can be determined. The moving event can occur on different dates for two or more consecutive years. A residual time series can be generated by removing the effect of the moving event from the adjusted time series. A base forecast that is independent of the repetitive characteristic and the effect of the moving event can be generated using the residual time series. A predictive forecast can be generated by including the repetitive characteristic and the effect of the moving event into the base forecast.

24 Claims, 25 Drawing Sheets

(56) References Cited

U.S. PATENT DOCUMENTS

| | | | |
|---|---|---|---|
| 8,631,040 B2 | 1/2014 | Jackson et al. | |
| 2004/0215976 A1* | 10/2004 | Jain | H04L 63/1458 726/23 |
| 2006/0116830 A1 | 6/2006 | Shan | |
| 2008/0097831 A1 | 4/2008 | Cihla | |
| 2008/0221958 A1 | 9/2008 | Baumgartner | |
| 2009/0216611 A1 | 8/2009 | Leonard et al. | |
| 2010/0332271 A1 | 12/2010 | De Spong | |
| 2011/0119109 A1* | 5/2011 | Teal | G06F 17/30604 705/7.31 |
| 2012/0303411 A1 | 11/2012 | Chen et al. | |
| 2013/0080457 A1 | 3/2013 | Narayanan et al. | |
| 2015/0032505 A1 | 1/2015 | Ohmori et al. | |
| 2016/0323157 A1* | 11/2016 | Marvasti | H04L 43/04 |
| 2017/0061297 A1 | 3/2017 | Joshi et al. | |

OTHER PUBLICATIONS

Ratnadip Adhikari and R. K. Agrawal, "An Introductory Study on Time Series Modeling and Forecasting" retrieved from https://arxiv.org/ftp/arxiv/papers/1302/1302.6613.pdf on Jul. 8, 2016, 67 pages.

Non-Final Office Action dated Jan. 5, 2017 for U.S. Appl. No. 15/233,610; 50 pages.

Crichlow , "An introduction to distributed and parallel computing", Prentice Hall International, 1988, 238 pages.

SAS, "Demand Forecasting for Retail 4.2-SP3: Installation Guide," May 2009; 28 pages.

SAS, "SAS Forecast Server," 5 pages.

Final Office Action dated Jul. 13, 2017 for U.S. Appl. No. 15/233,610; 17 pages.

\* cited by examiner

FORECASTING INTEREST IN AN OBJECT OVER A FUTURE PERIOD OF TIME USING A THREE-STAGE TIME-SERIES ANALYSIS PROCESS

REFERENCE TO RELATED APPLICATION

This claims the benefit of priority under 35 U.S.C. §119 (e) to U.S. Provisional Patent Application No. 62/212,542, titled "Three Stage Forecasting" and filed Aug. 31, 2015, to U.S. Provisional Patent Application No. 62/219,191, titled "THREE STAGE FORECASTING" and filed Sep. 16, 2015, and to U.S. Provisional Patent Application No. 62/279,443, titled "Three Stage Forecasting" and filed Jan. 15, 2016, the entirety of each of which is hereby incorporated by reference herein.

TECHNICAL FIELD

The present disclosure relates generally to modeling and simulation. More specifically, but not by way of limitation, this disclosure relates to a three-stage predictor for time series data.

BACKGROUND

Time series data can indicate interest in an object (e.g., a product) over a period of time. For example, time series data can include a series of data points arranged in a sequential order over the period of time with magnitudes representing the demand for the object over the period of time. It can be desirable to analyze the time series data to predict future interest in the object. But time series data can be noisy, span a short duration, and have other characteristics that can make it challenging to analyze.

SUMMARY

In one example, a non-transitory computer readable medium comprising program code that is executable by a processor is provided. The program code can cause the processor to receive a time series comprising a plurality of data points arranged in a sequential order over a period of time. The program code can cause the processor to determine a repetitive characteristic of the time series by analyzing the time series for a pattern that repeats over a predetermined time period. The program code can cause the processor to generate an adjusted time series by removing the repetitive characteristic from the time series. The program code can cause the processor to determine, using the adjusted time series, an effect of one or more moving events that occur on different dates for two or more consecutive years on the adjusted time series. The program code can cause the processor to generate a residual time series by removing the effect of the one or more moving events from the adjusted time series. The program code can cause the processor to generate, using the residual time series, a base forecast that is independent of the repetitive characteristic and the effect of the one or more moving events. The program code can cause the processor to generate a predictive forecast by including the repetitive characteristic and the effect of the one or more moving events into the base forecast.

In another example, a method is provided that can include receiving a time series comprising a plurality of data points arranged in a sequential order over a period of time. The method can include determining a repetitive characteristic of the time series by analyzing the time series for a pattern that repeats over a predetermined time period. The method can include generating an adjusted time series by removing the repetitive characteristic from the time series. The method can include determining, using the adjusted time series, an effect of one or more moving events that occur on different dates for two or more consecutive years on the adjusted time series. The method can include generating a residual time series by removing the effect of the one or more moving events from the adjusted time series. The method can include generating, using the residual time series, a base forecast that is independent of the repetitive characteristic and the effect of the one or more moving events. The method can include generating a predictive forecast by including the repetitive characteristic and the effect of the one or more moving events into the base forecast.

In another example, a system is provided that can include a processing device and a memory device. The memory device can include instructions executable by the processing device for causing the processing device to receive a time series comprising a plurality of data points arranged in a sequential order over a period of time. The instructions can cause the processing device to determine a repetitive characteristic of the time series by analyzing the time series for a pattern that repeats over a predetermined time period. The instructions can cause the processing device to generate an adjusted time series by removing the repetitive characteristic from the time series. The instructions can cause the processing device to determine, using the adjusted time series, an effect of one or more moving events that occur on different dates for two or more consecutive years on the adjusted time series. The instructions can cause the processing device to generate a residual time series by removing the effect of the one or more moving events from the adjusted time series. The instructions can cause the processing device to generate, using the residual time series, a base forecast that is independent of the repetitive characteristic and the effect of the one or more moving events. The instructions can cause the processing device to generate a predictive forecast by including the repetitive characteristic and the effect of the one or more moving events into the base forecast.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
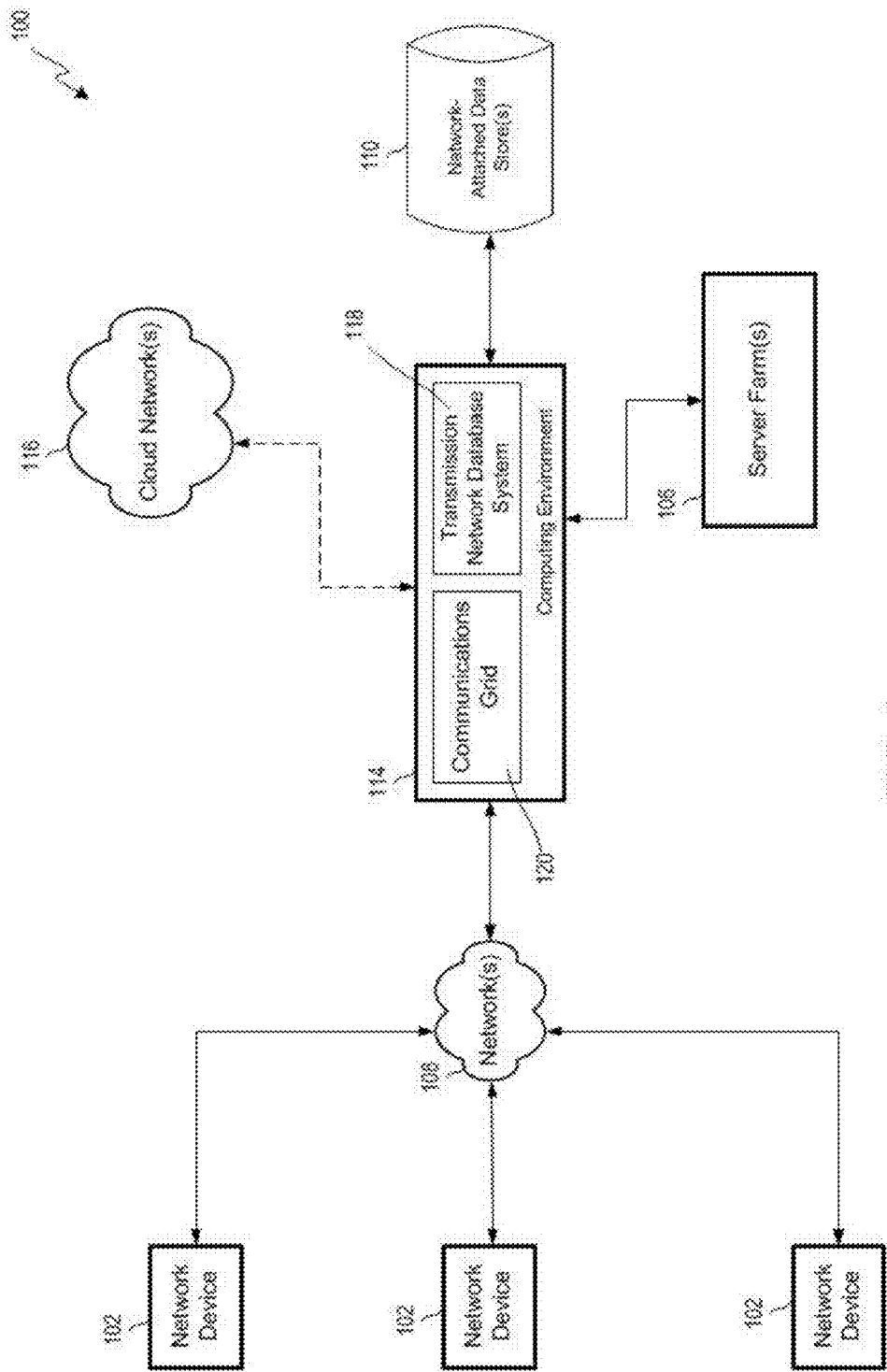
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provides those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to using a time series associated with an object (e.g., a product) to predict future interest in the object over a future period of time. A computing device can predict the future interest using a three-stage process. For example, the computing device can implement a first stage of the three-stage process by identifying and removing a seasonal component from the time series. The computing device can implement a second stage of the three-stage process by identifying a moving event, such as Father's Day, associated with the time series and removing the effects of the moving event from the time series. After the second stage, the time series can be free from the seasonality and the effects of the moving event. This version of the time series can be referred to as a residual time series. The computing device can implement a third stage of the three-stage process by using the residual, the seasonal aspect of the time series, and the effects of the moving event to generate the prediction.

Not all time series may be compatible with the three-stage process. A computing device according to some examples can determine if the time series is compatible with the three-stage process prior to implementing the three-stage process using the time series. If so, the computing device can implement the three-stage process to predict future interest in the object. If not, the computing device can implement another process to predict future interest in the object.

Some examples can reduce the total number of processing iterations, time, memory, and electrical power used by the computing device to predict the future interest in the object. For example, the three-stage process can require fewer computational iterations and less memory usage than other predictive processes, while obtaining a similar level of accuracy. Thus, the three-stage process can be faster and computationally less expensive than other predictive processes. Further, in some examples, the computing device can select an appropriate predictive process to use with a particular time series, which can ensure that unnecessary computational iterations are not performed and memory space is not wasted by attempting to use an incompatible predictive process with the particular time series.

FIGS. 1-10 depict examples of systems and methods usable for a three-stage predictor according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in predicting future interest in an object from time series data associated with the object, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for predicting future interest in an object to a network-attached data store 110 for storage. The computing environment 114 may later retrieve the data from the network-attached data store 110 and use the data to predict future interest in the object.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for performing data analytics or predicting future interest in an object.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for predicting future interest in an object. For example, the computing environment 114, a network device 102, or both can implement one or more versions of the processes discussed with respect to FIGS. 11-12.

Figure 2:
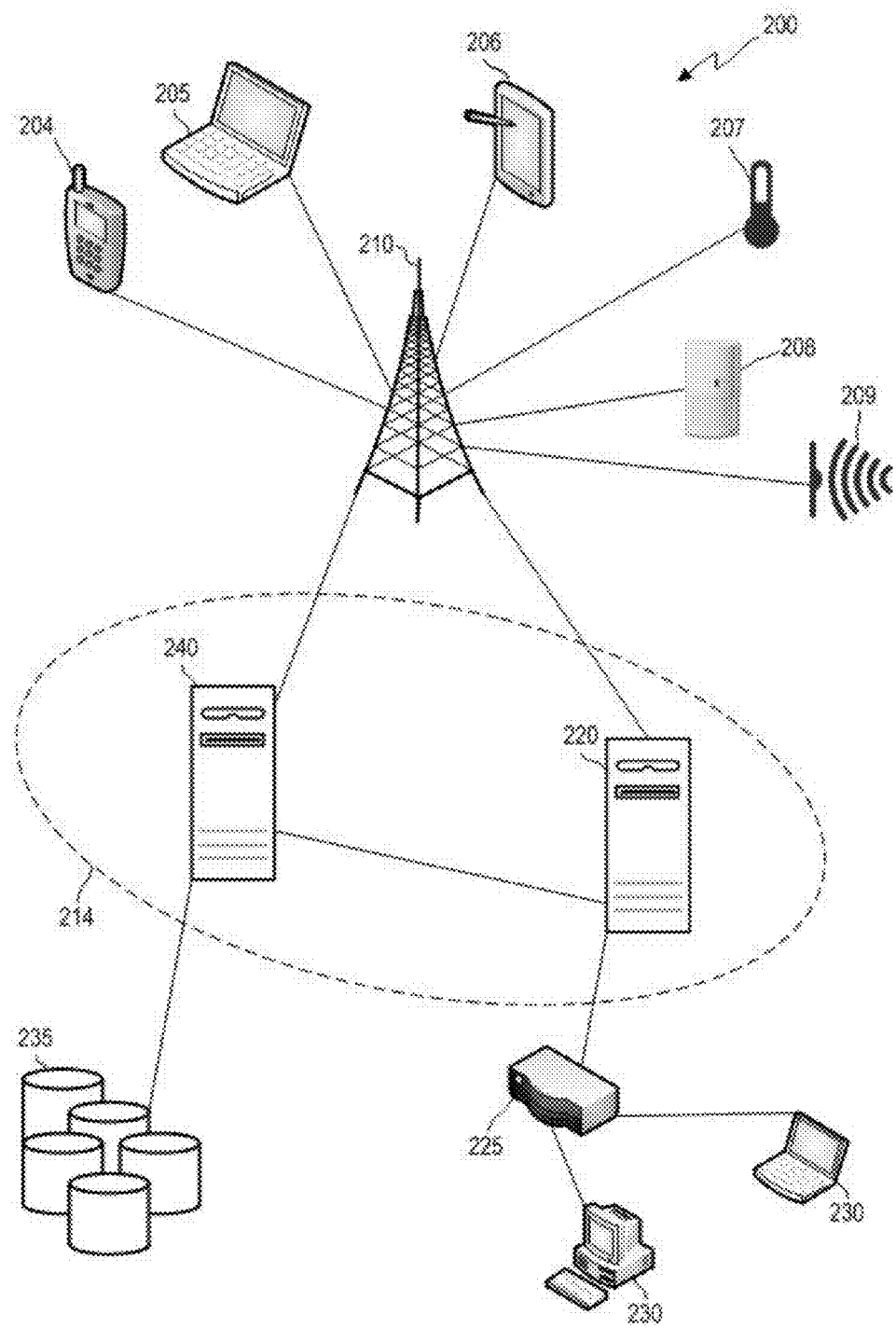
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to predicting future interest in an object associated with the data).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which future interest in an object is determined from data, the computing environment 214 can perform a pre-analysis of the data. The pre-analysis can include determining whether the data is in a correct format for predicting future interest in an object using the data and, if not, reformatting the data into the correct format.

Figure 3:
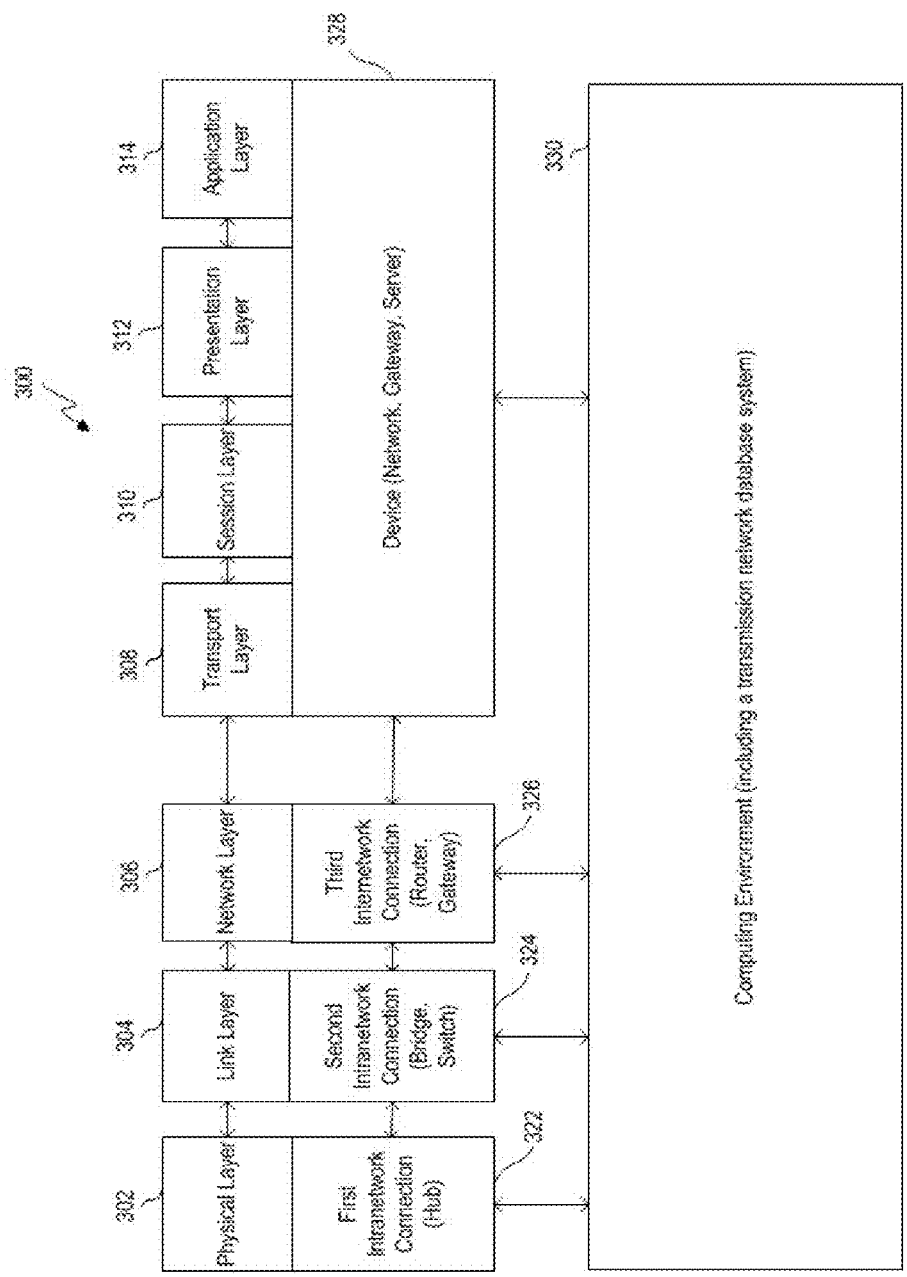
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as a forecasting application, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for predicting future interest in an object.

Figure 4:
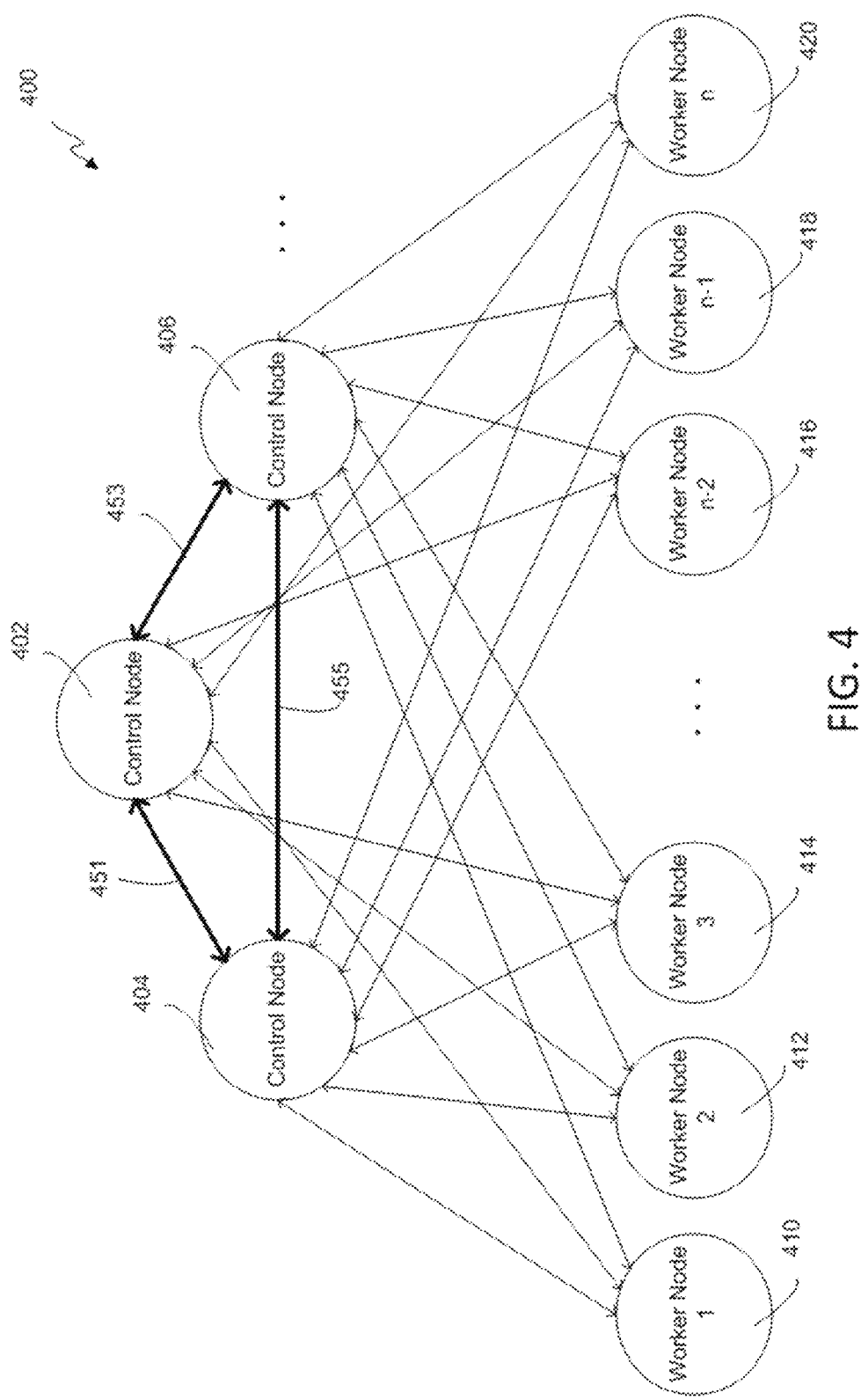
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a forecasting job being performed or an individual task within a forecasting being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to predicting future interest in an object from a data set. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for predicting future interest in an object can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may predict future interest in an object using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to predict future interest in an object.

Figure 5:
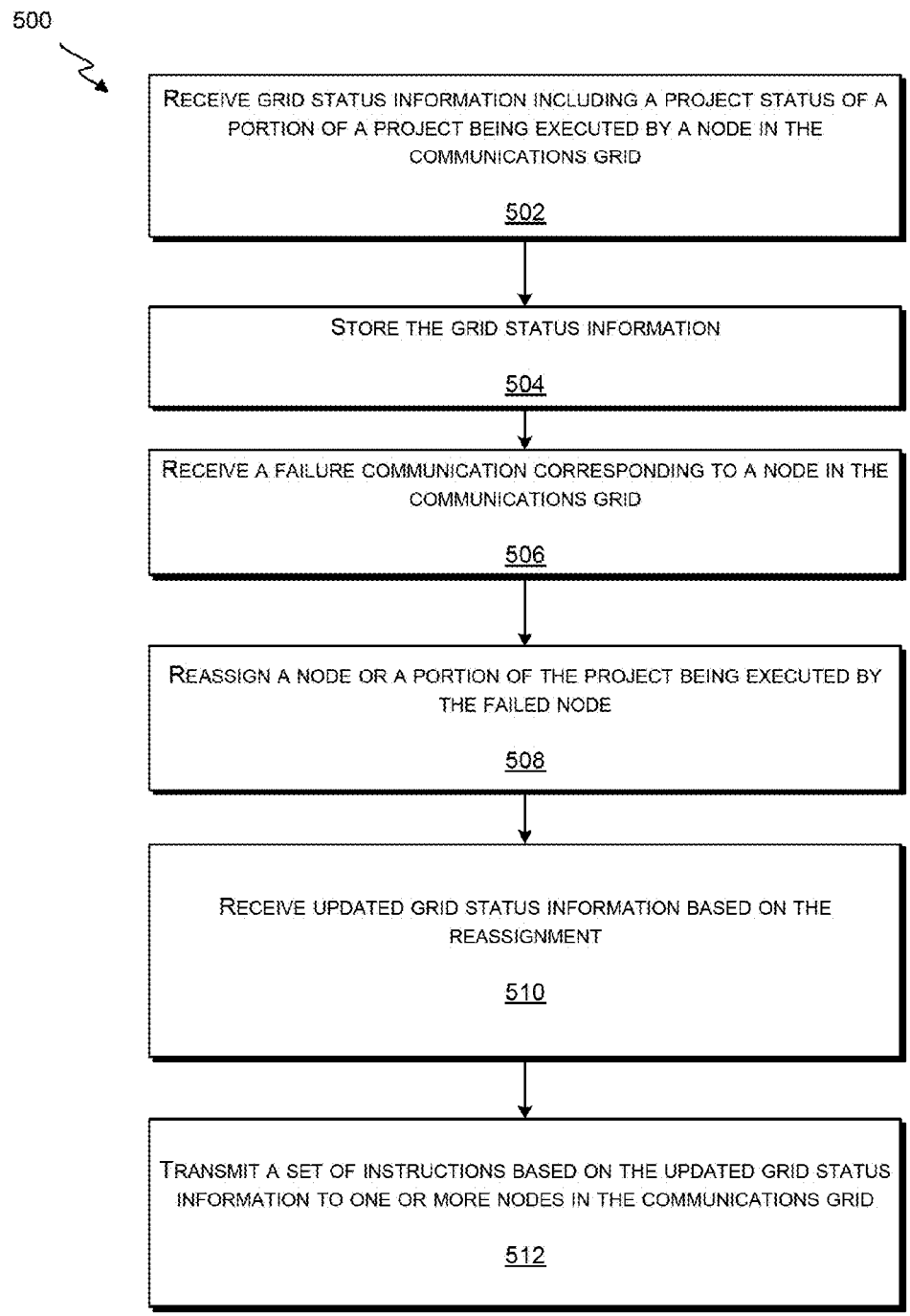
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
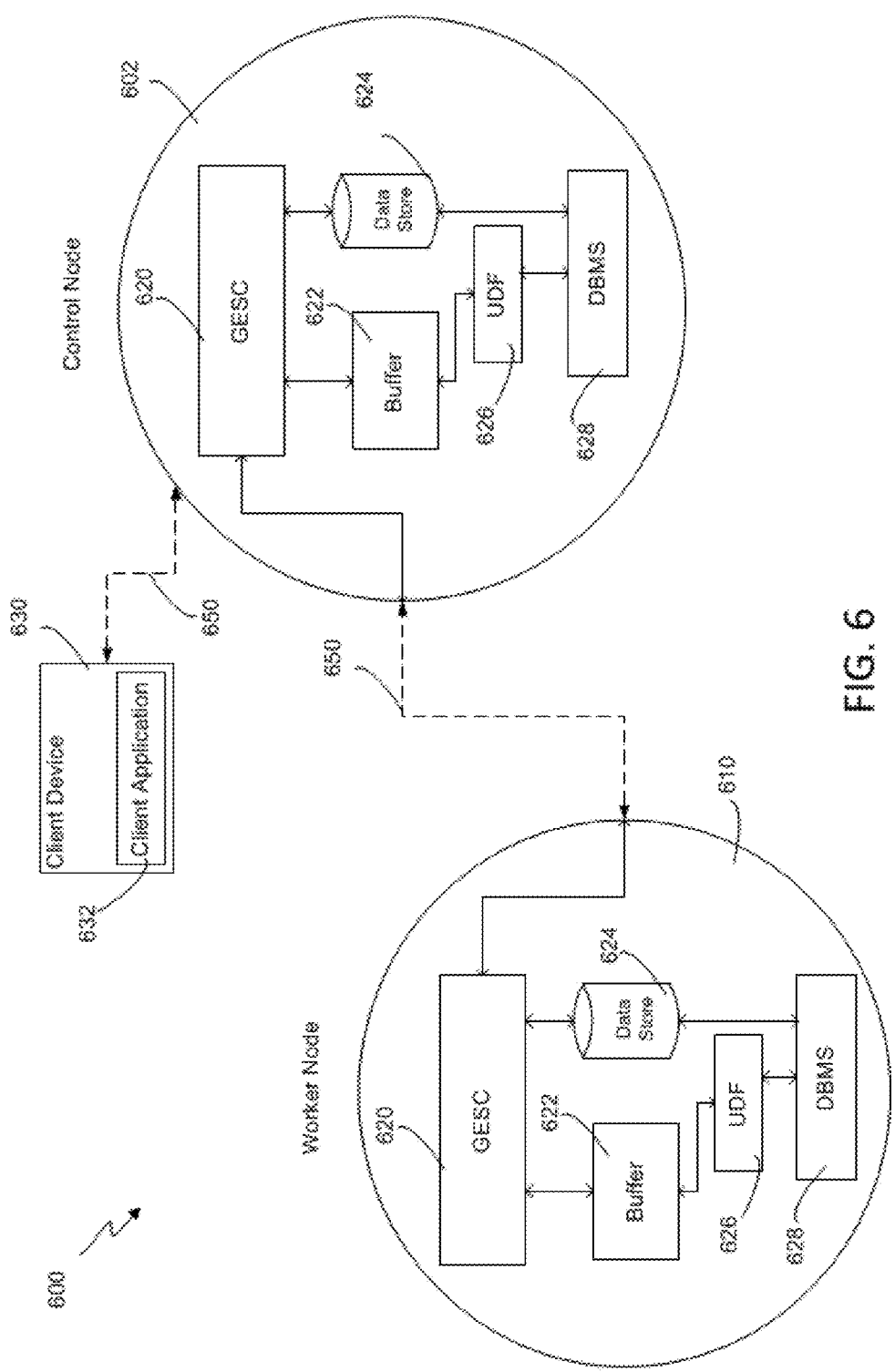
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
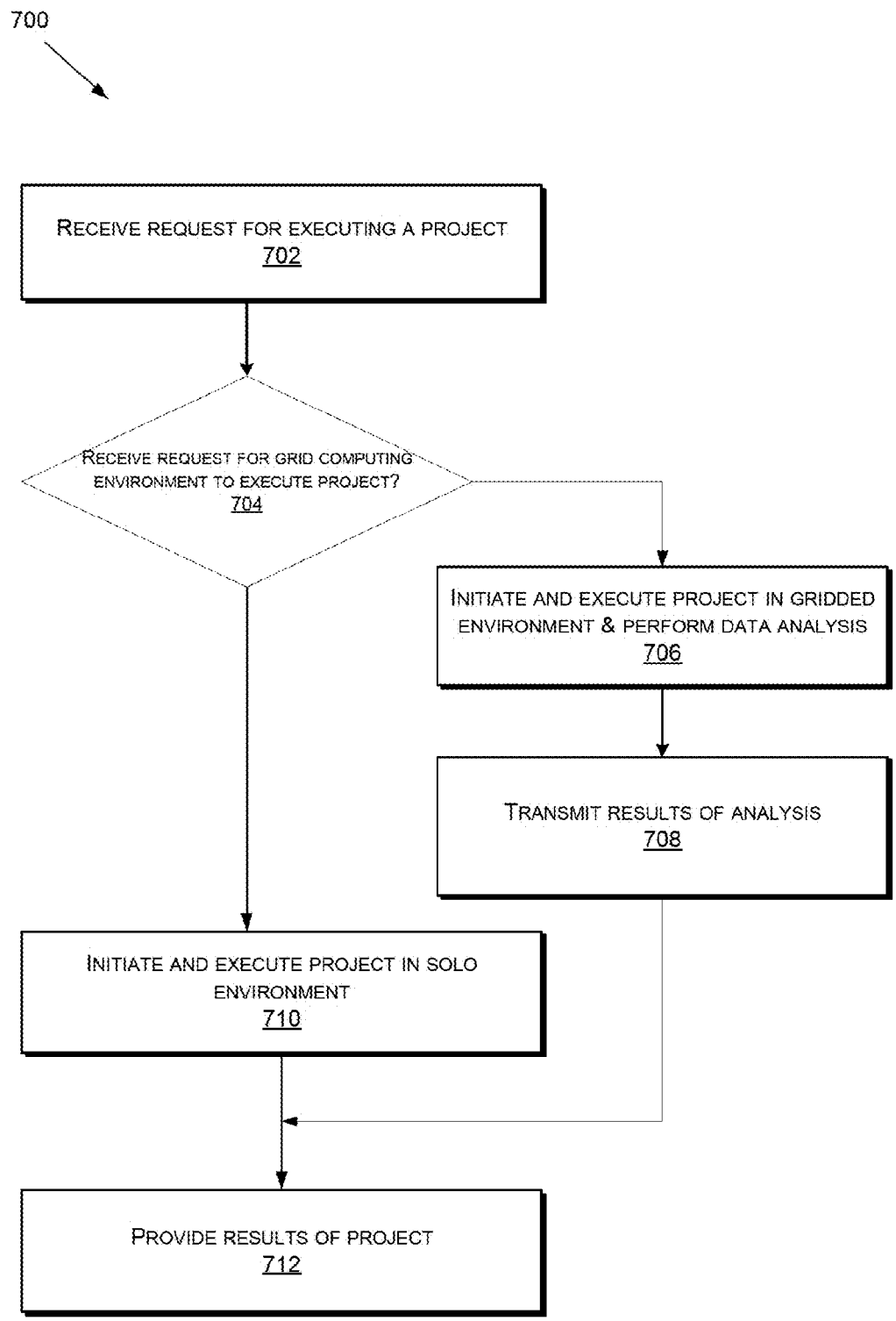
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
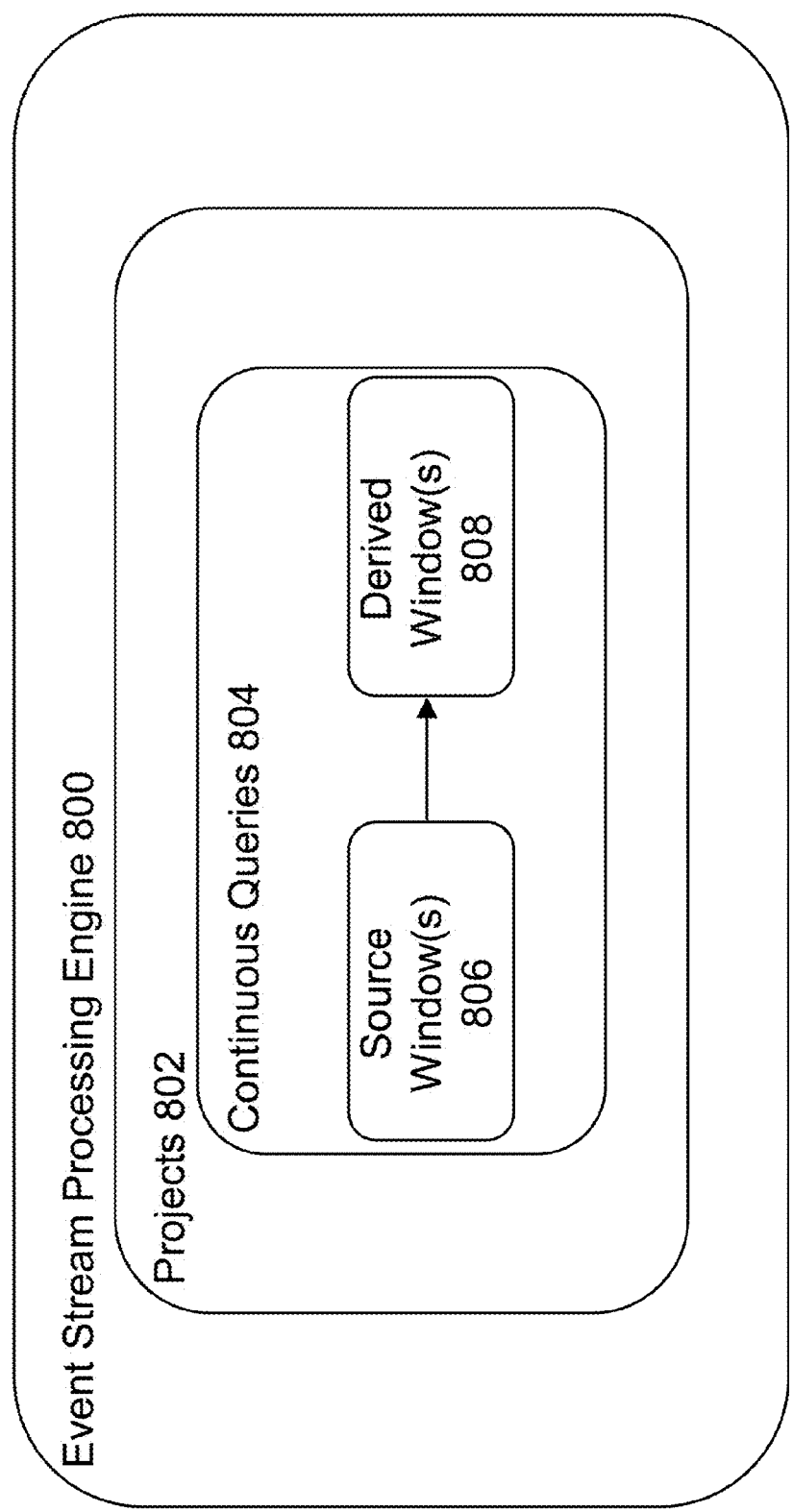
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
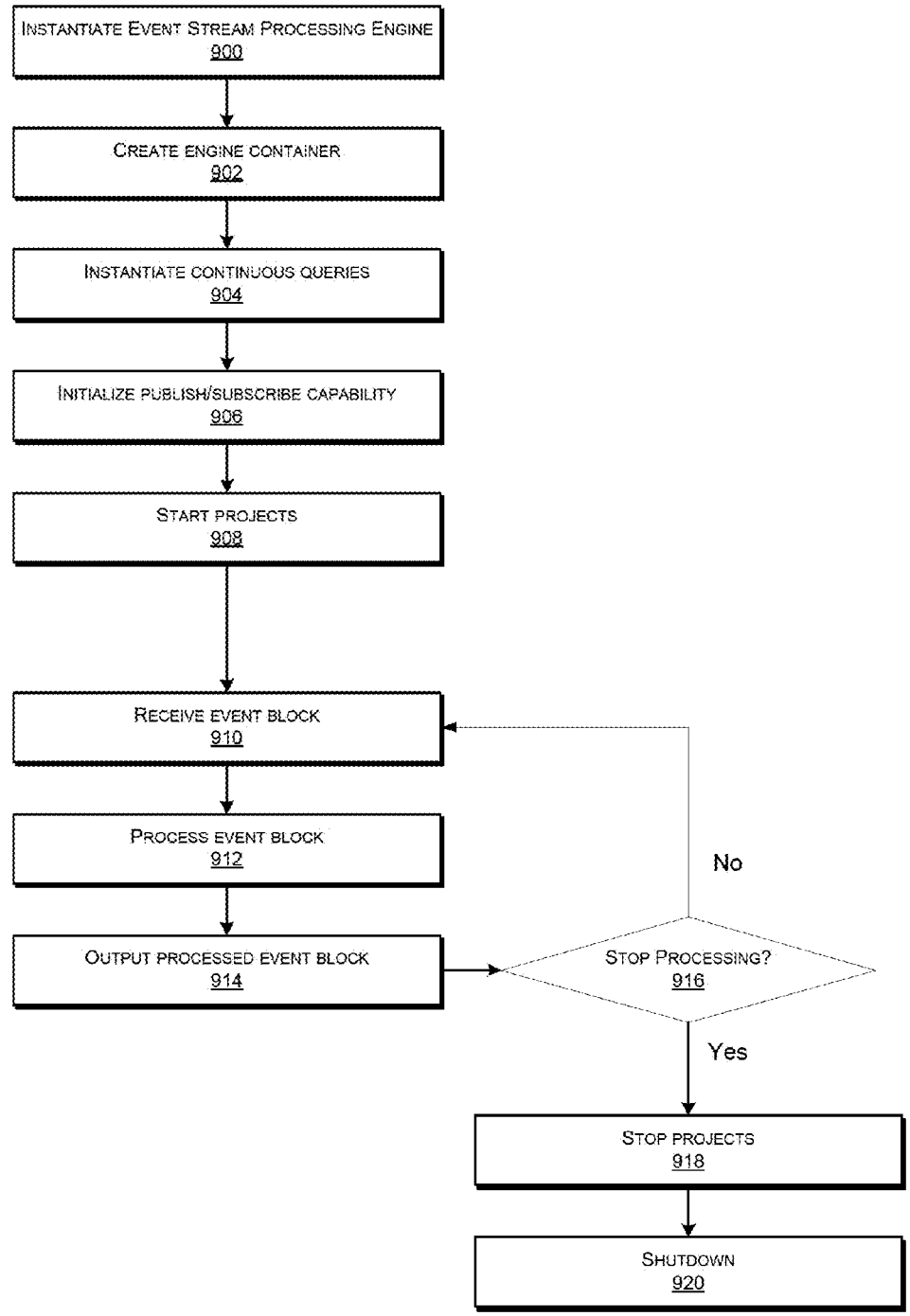
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
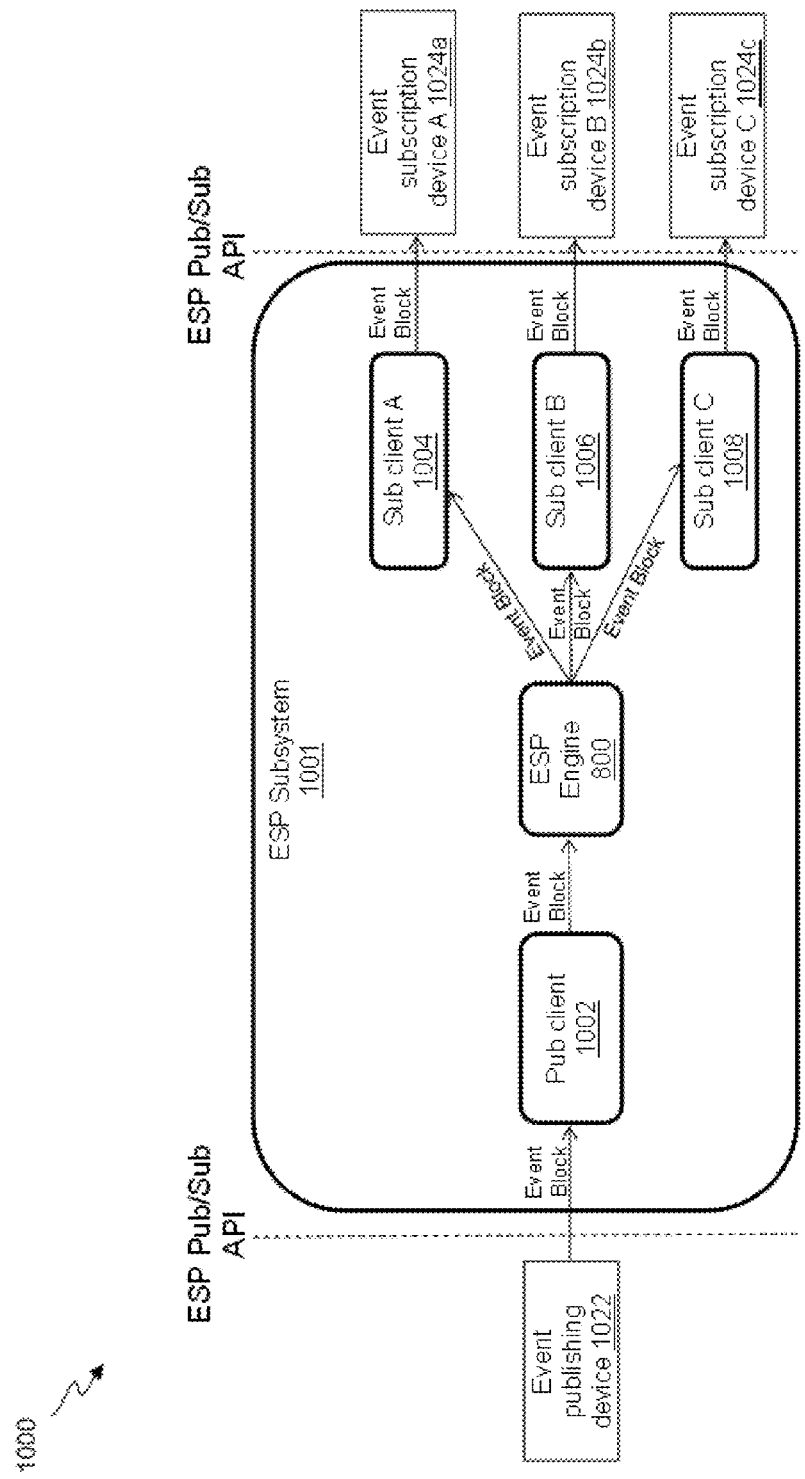
FIG. 10 is a block diagram of an ESP system interfacing between a publishing device and multiple event subscribing devices according to some aspects.

FIG. 10 is a block diagram of an ESP system 1000 interfacing between publishing device 1022 and event subscribing devices 1024*a-c* according to some aspects. ESP system 1000 may include ESP device or subsystem 1001, publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on publishing device 1022. The event block object may generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a*-*c*. For example, subscribing client A 804, subscribing client B 806, and subscribing client C 808 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
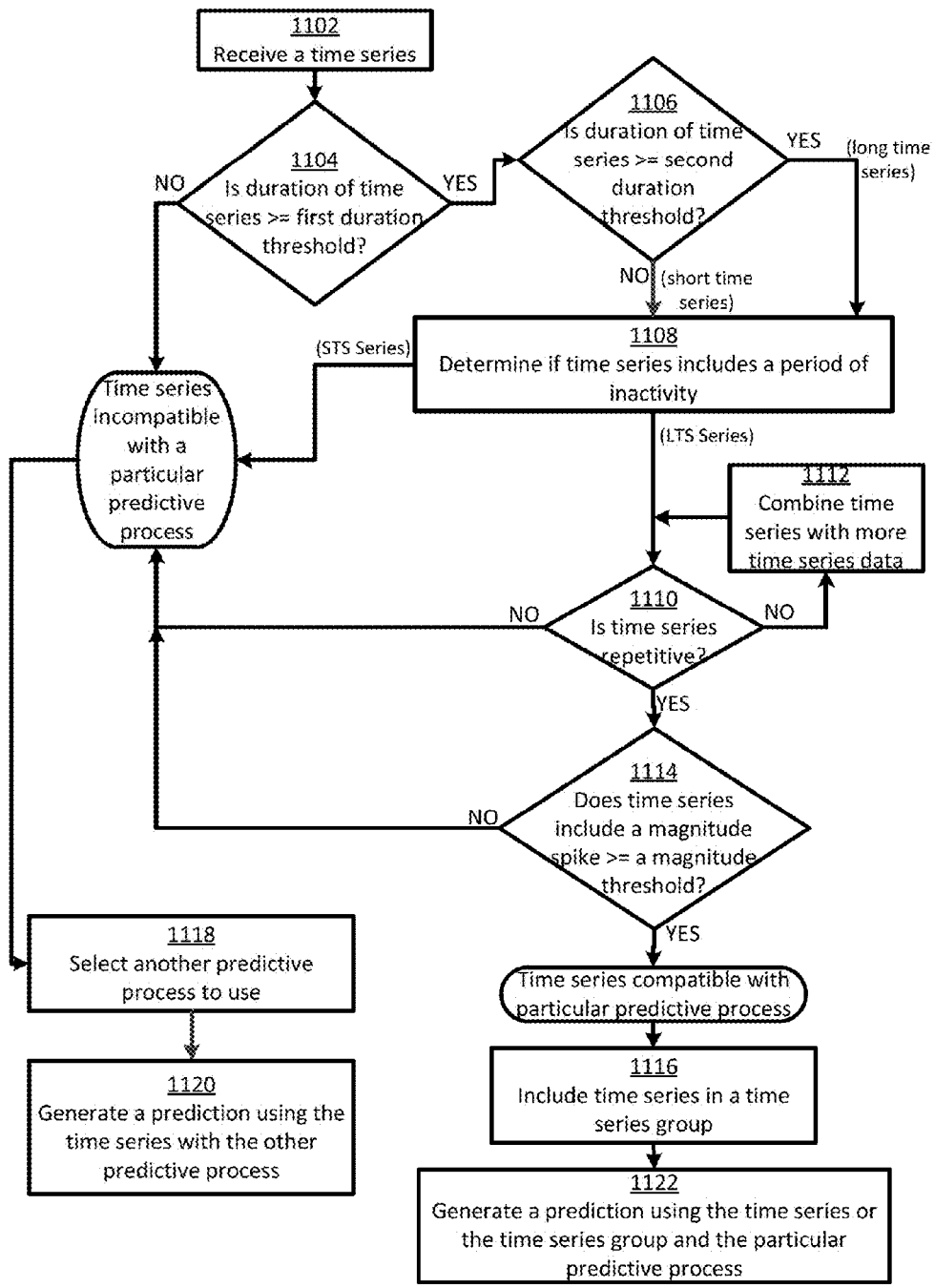
FIG. 11 is a flow chart of an example of a process for determining if a time series is compatible with a particular process for predicting future interest in an object according to some aspects.

FIG. 11 is a flow chart of an example of a process for determining if a time series is compatible with a particular process for predicting future interest in an object according to some aspects. All time-series are not necessarily compatible with all processes for generating predictions of future interest (e.g., forecasts). A computing device according to some examples can determine whether a particular time series is compatible with a particular process for generating a prediction of future interest (e.g., prior to trying to use the time series with the particular process). In some examples, the computing device can include or use three stages to generate the prediction, as discussed with respect to FIG. 14.

Some examples can include more, fewer, or different steps than the steps depicted in FIG. 11. Also, some examples can implement the steps of the process in a different order. Some examples can be implemented using any of the systems and processes described with respect to FIGS. 1-10.

In block 1102, a processor receives a time series. The time series can be associated with an object (e.g., a product, such as a ticket; car; mobile phone; utility, such as electricity or water; a hotel room; etc.). The time series can represent interest in (e.g., demand for, sales of, or use of) the object. The time series can include a series of data points arranged in a sequential order over the period of time and having magnitudes that indicate the amount of interest in the object over the period of time.

In some examples, the processor can receive the time series from a local memory device. For example, the processor can retrieve the time series from a local memory device. In other examples, the processor can receive the time series from a remote computing device via a network. For example, the processor can retrieve the time series from a remote database via the Internet. The processor can receive some or all of the time series from any number and combination of computing devices, databases, and memory devices.

In block 1104, the processor determines if the time series spans a duration that is greater than or equal to a first duration threshold, which can be preset or predetermined. An example of the first duration threshold can be one year. For example, the processor can determine if the time series spans a duration that is greater than or equal to one year.

If the processor determines that the time series spans a duration that is greater than or equal the first duration threshold, the process can proceed to block 1106. Otherwise, the processor can determine that the time series is incompatible with a particular prediction process, such as a three-stage process. In some examples, if the processor determines that the time series is incompatible with the particular prediction process, the process can proceed to block 1118. In block 1118, the processor can select a different predictive process for use with the time series. Examples of the different predictive process can include using an autoregressive integrated moving average (ARIMA) model, an ARIMAX model, or an exponential smoothing model (ESM). For example, the processor can determine that another predictive process can be used with time series that spans a duration of less than one year. The processor can select the other predictive process for use with the time series to predict interest in the object. In some examples, the processor can proceed to block 1120, in which the processor can predict interest in the object using the time series as input for the other predictive process.

In block 1106, the processor determines if the time series spans a duration that is greater than or equal to a second duration threshold, which can be preset or predetermined. An example of the second duration threshold can be two years. For example, the processor can determine if the time series spans a duration that is greater than or equal to two years.

If the time series spans a duration that is greater than or equal to the second duration threshold, the time series can be referred to as a long time series. If the time series spans a duration that is greater than or equal to the first duration threshold, but less than the second duration threshold, the time series can be referred to as a short time series.

In block 1108, the processor determines if the time series includes a period of inactivity. The period of inactivity can include consecutive hours, days, weeks, or months of inactivity. For example, the processor can analyze the time series to determine if the time series includes a timespan of a predetermined length (e.g., a predetermined number of consecutive hours, days, weeks, or months) that has magnitudes below a predetermined magnitude threshold. If so, the processor can determine that the time series includes the period of inactivity. Such a time series can be referred to as a short time span (STS) series, and can be incompatible with the particular predictive process. Otherwise, the processor can determine that the time series does not include the period of inactivity (e.g., the time series has a consistent and continuous pattern of activity). Such a time series can be referred to as a long time span (LTS) series.

As a particular example, the time series can relate to interest in a product over a one year period. The processor can analyze the time series to determine if the time series includes a timespan (e.g., a consecutive time period) that is at least a week long during which demand was below a predetermined amount, such as 50 units. If so, the processor can determine that the time series includes the period of inactivity, and is a STS series. If not, the processor can determine that the time series does not include the period of inactivity, and is a LTS series. If the processor determines that the time series does not include the period of inactivity (e.g., the time series is a LTS series), the process can continue to block 1110.

In block 1110, the processor determines if at least a portion of the time series is repetitive (e.g., seasonal or periodic). For example, the processor can analyze the magnitudes of the time series to determine if a pattern of magnitudes exists that repeats at least once during the duration of the time series. In some examples, the processor can determine that the time series includes a particular pattern of magnitudes occurring on a daily, weekly, monthly, quarterly, or yearly cycle, or with another frequency. If the processor determines that the time series is not repetitive, the processor may determine that the time series is incompatible with the particular predictive process. Alternatively, if the processor determines that the time series is not repetitive, the process can continue to block 1112. If the processor determines that the time series is repetitive, the process can continue to block 1114.

In block 1112, the processor combines the time series with additional time-series data. The processor can receive the additional time-series data from a local memory device or a remote computing device via a network. In some examples, the processor can combine the time series with the additional time-series data by appending the additional time-series data to, prepending the additional time-series data to, or otherwise including the additional time-series data in the time series. The processor can additionally or alternatively combine the time series with the additional time-series data using a hierarchical aggregation technique. The additional time-series data can include another time series, which can be associated with the same object or a different object. In some examples, combining the time series with the additional time-series data can extend the length of the time series enough for the processor to be able to determine a repetitive characteristic of the time series.

In some examples, the processor can perform step 1112 prior to block 1110. For example, a short time series may not have enough data for the processor to determine a repetitive characteristic of the short time series. So, if the processor determines that the time series is a short time series, the processor can combine the short time series with additional time-series data to extend the length of the short time series prior to determining if the time series is repetitive.

In block 1114, the processor determines if the time series includes a magnitude spike that exceeds a magnitude threshold, which can be a preset or predetermined threshold. In some examples, the processor can determine if the time series includes the magnitude spike that exceeds the magnitude threshold by performing one or more steps shown in FIG. 12.

Figure 12:
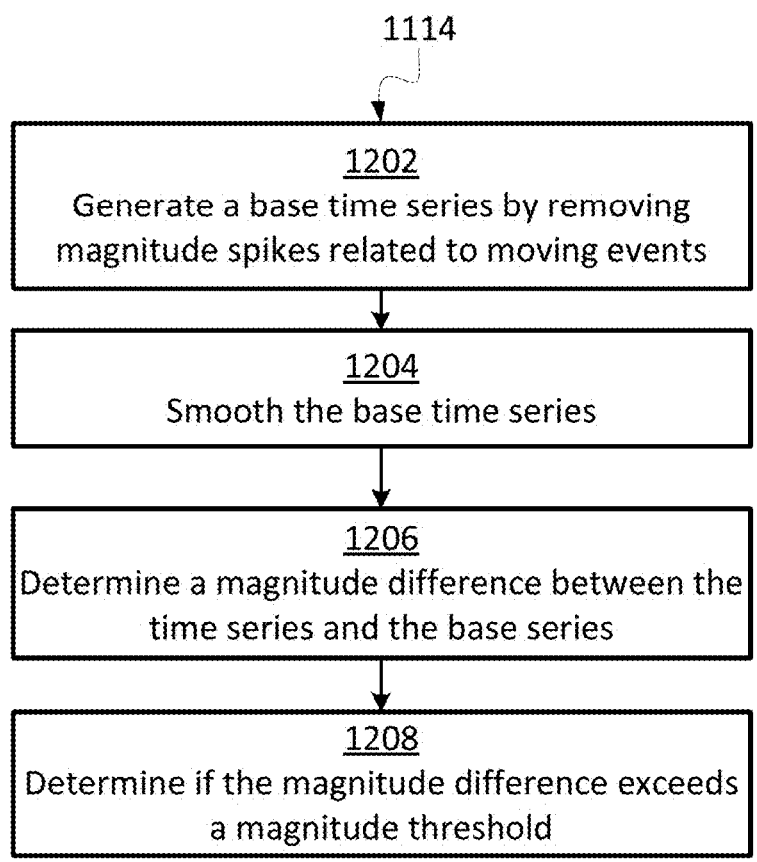
FIG. 12 is a flow chart of an example of a process for determining if a magnitude spike in a time series exceeds a magnitude threshold according to some aspects.

Turning to FIG. 12, in block 1202, the processor generates a base time series by removing magnitude spikes in the time series that are related to moving events. A moving event can include an event that occurs on different days for two consecutive years. Examples of moving events can be Easter, Mother's Day, Father's Day, a promotion, a company event, etc. A moving event can be represented in the time series as a magnitude spike or pattern of magnitude spikes that occurs on different days during two consecutive years in the time series. As a particular example, a moving event can be a Father's Day promotion that occurs on different days during two consecutive years. The time series can include magnitude spikes indicating increased interest in a product (due to the Father's Day promotion) on the different days during the two consecutive years.

In some examples, the processor can determine the moving events by analyzing the time series for repetitive magnitude spikes, dips, or both that occur with variable frequency in the time series. After determining the moving events, the processor can generate the base time series by removing the magnitude spikes corresponding to the moving events.

For example, the processor can determine that a particular magnitude spike (or a particular pattern of magnitude spikes) occurs in the time series at varying intervals. This can cause the processor to associate the particular magnitude spike (or the particular pattern of magnitude spikes) with a moving event. The processor can remove this magnitude spike (or the particular pattern of magnitude spikes) throughout the time series to generate the base time series, so that the base time series has magnitude gaps where the magnitude spikes have been removed.

In block 1204, the processor smooths the base time series. In some examples, the processor can smooth the base time series using an exponential smoothing method. Additionally or alternatively, the processor can smooth the time series by filling in the magnitude gaps in the base time series. For example, the processor can determine an average magnitude value based on magnitudes of data points proximate to a magnitude gap. The processor can then fill in the magnitude gap with the average magnitude value. The processor can repeat this process for some or all of the magnitude gaps. In other examples, the processor can use a predetermined magnitude value to fill in the magnitude gaps. The processor can use any number and combination of techniques to fill in the magnitude gaps.

In block 1206, the processor determines a magnitude difference between the time series and the base time series. For example, the processor can subtract the magnitude value for each point in the base time series corresponding to a moving event from the magnitude value for the corresponding point in the time series. The resulting magnitude differences between the base time series and the time series can represent the effect the moving event has on the time series.

In block 1208, the processor determines if a magnitude difference exceeds a magnitude threshold. For example, the processor can determine if the magnitude difference is statistically significant. In one such example, the processor can determine a standard deviation of the magnitudes of some or all of data points in the base time series. The processor can use the standard deviation as the magnitude threshold. Alternatively, the processor can multiply the standard deviation by a scaling factor, such as two, and use the resulting value as the magnitude threshold. With the magnitude threshold determined, the processor can then determine if an absolute value of the magnitude difference meets or exceeds the magnitude threshold.

Returning to FIG. 11, if the processor determines that the time series includes a magnitude spike that exceeds a magnitude threshold, the processor can determine that the time series is compatible with the particular predictive process. In some examples, the process can then proceed to block 1116. if the processor determines that the time series does not include a magnitude spike that exceeds the magnitude threshold, the processor can determine that the time series is incompatible with the particular predictive process.

In block 1116, the processor includes the time series in a time series group. For example, some or all of the time series determined to be compatible with the particular predictive process can be categorized into groups having similar magnitude patterns. A prediction of future interest (e.g., a forecast) can then be generated using some or all of the time series in a particular time series group. This can provide more robust and accurate results than generating the prediction of future interest from a single time series alone. In some examples, the processor can include the time series in a time series group by performing one or more steps shown in FIG. 13.

Figure 13:
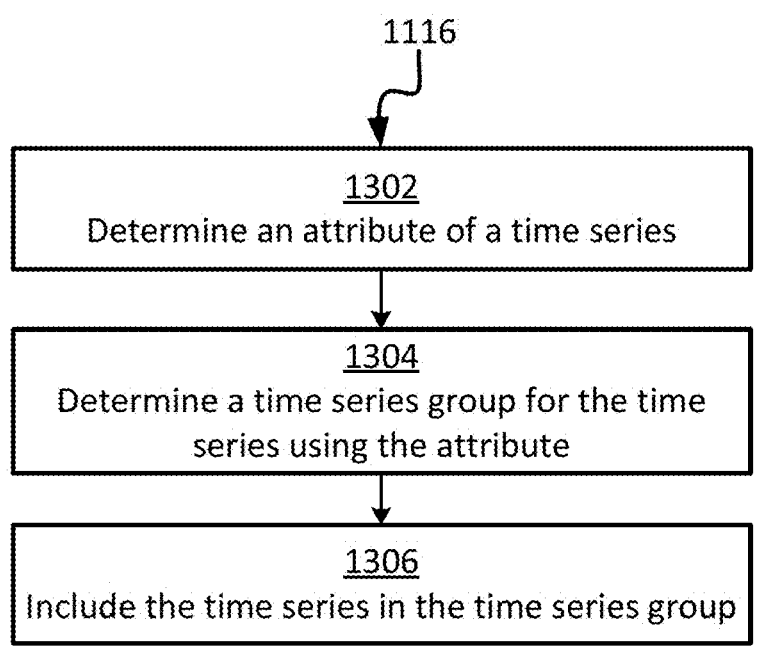
FIG. 13 is a flow chart of an example of a process for including a time series in a time series group according to some aspects.

Turning to FIG. 13, in block 1302, the processor determines an attribute (or multiple attributes) of the time series. Examples of the attribute can include a frequency of an event (e.g., magnitude spike or pattern of magnitude spikes) in the time series, a timing of an event in the time series, a difference (sometimes referred to as lift and represented in a percentage) between the time series and the base time series (e.g., determined in blocks 1202-1204), an average difference between the time series and the base time series, a maximum difference between the time series and the base time series, or any combination and derivation of these. For example, the processor can analyze the time series to determine the average lift between the time series and the base time series.

In block 1304, the processor uses the attribute (or multiple attributes) to determine a time series group for the time series. For example, the processor can determine a group of time series that have similar attributes to the attribute determined in block 1302. The processor can use a clustering method to determine the group of time series that have the similar attributes. Examples of the clustering method can include a hierarchical clustering method, a K-means clustering method, or both of these. Any number and combination of clustering methods, or other grouping methods, can be used to determine the time series group for the time series.

In block 1306, the processor includes the time series in the time series group. The time series group can include multiple time series having similar attributes, such as similar magnitude patterns during corresponding time periods.

Returning to FIG. 11, in some examples, blocks 1102-1120 can be repeated for multiple time series. By repeating blocks 1102-1120, the processor can automatically identify multiple time series that are compatible with a particular predictive process and group the time series into corresponding time serious groups. The processor can also automatically identify time series that are incompatible with the particular predictive process and select other, more suitable predictive-processes to use with those time series. This can allow for large-scale automation of such predictions.

In block 1122, the processor can generate a prediction of interest in the object using the time series or the time series group with the particular predictive process. For example, the processor can generate the prediction of interest using one or more steps shown in FIG. 14.

Figure 14:
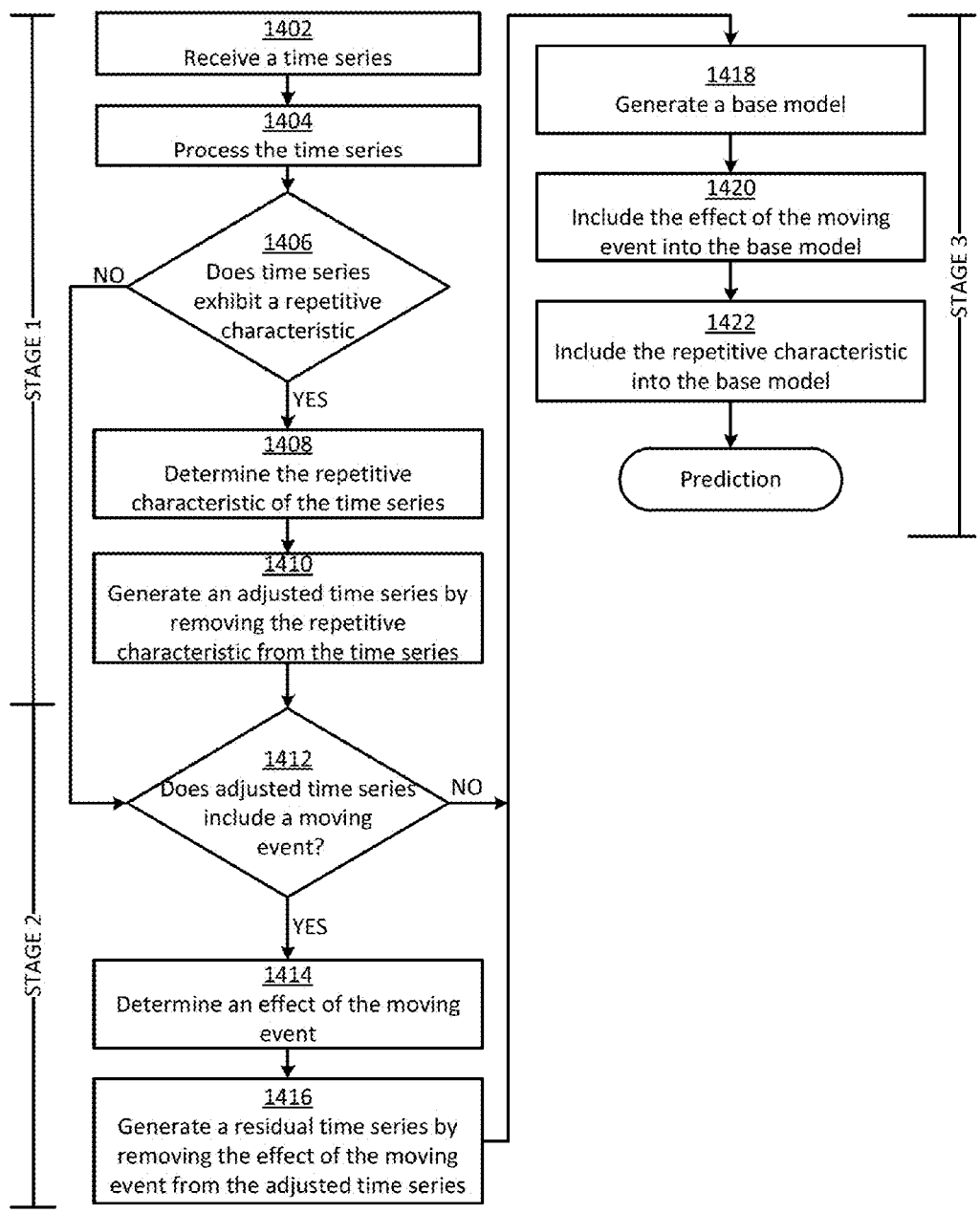
FIG. 14 is a flow chart of an example of a process for predicting future interest in an object according to some aspects.

FIG. 14 is a flow chart of an example of a process for predicting future interest in an object according to some aspects. Some examples can include more, fewer, or different steps than the steps depicted in FIG. 14, such as steps depicted in other figures (e.g., FIGS. 11-13). Also, some examples can implement the steps of the process in a different order. Some examples can be implemented using any of the systems and processes described with respect to FIGS. 1-10.

The process shown in FIG. 14 can be conceptualized as including three stages. A first stage can include blocks 1402-1410. A second stage can include blocks 1412-1416. A third stage can include blocks 1418-1422. But other combinations and arrangements of the stages and blocks can be used.

In block 1402, a processor receives a time series. The time series can be associated with an object. In some examples, the processor can receive the time series from a local memory device. For example, the processor can retrieve the time series from a local memory device. In other examples, the processor can receive the time series from a remote computing device via a network. For example, the processor can retrieve the time series from a remote database via the Internet. The processor can receive some or all of the time series from any number and combination of computing devices, databases, and memory devices.

In block 1404, the processor can process the time series. In some examples, the processor can process the time series by implementing one or more steps shown in FIG. 15.

Figure 15:
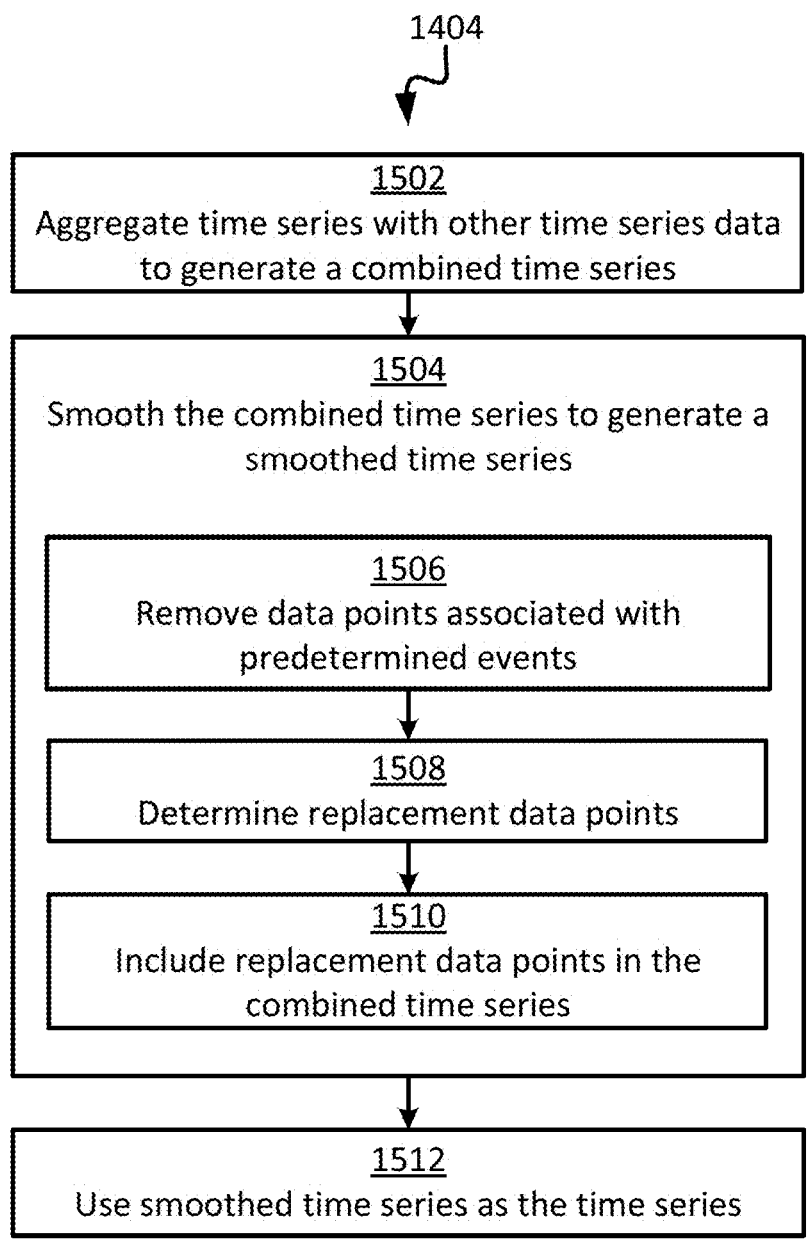
FIG. 15 is a flow chart of an example of a process for processing a time series according to some aspects.

Turning to FIG. 15, in block 1502, the processor aggregates the time series with other time series data to generate a combined time series. In some examples, the processor can determine if the time series spans a duration that is less than a threshold duration (e.g., one year). If so, the processor can aggregate the time series with the additional time series data to generate the combined time series. Otherwise, the processor may not aggregate the time series with the additional time series data, and may use the time series itself for the remainder of the blocks shown in FIG. 15.

In some examples, the additional time series data can include another time series. The other time series can be in the same time series group (e.g., the time series group determined in block 1116 of FIG. 11) as the original time series (e.g., the time series received in block 1402 of FIG. 14). For example, the processor can determine a time series group corresponding to the original time series. The processor can combine the original time series with one or more other time series in the same time-series group together into a single time series, which can be used as the combined time series. In some examples, the processor can combine the original time series with the one or more other time series using a hierarchical aggregation method.

In block 1504, the processor smooths the combined time series to generate a smoothed time series. In some examples, the processor can smooth the combined time series by performing one or more steps shown in blocks 1506-1510.

In block 1506, the processor removes data points from the combined time series that are associated with moving events, that are sporadic or inconsistent, that are outliers, or any combination of these. For example, the processor can receive user input or information from a database indicating information about a moving event. Based on the information, the processor can identify and remove data points in the combined time series associated with the moving event. Removing data points associated with moving events, that are sporadic or inconsistent, and that are outliers can reduce the number of major magnitude variations in the combined time series, which can make the combined time series easier to further analyze.

In some examples, the processor can determine that a particular magnitude spike (or a particular pattern of magnitude spikes) occurs in the combined time series at varying intervals. This can cause the processor to associate the particular magnitude spike (or the particular pattern of magnitude spikes) with a moving event. Based on the processor associating the magnitude spike with the moving event, the processor can remove data points corresponding to the magnitude spike (or the particular pattern of magnitude spikes) throughout the combined time series, leaving magnitude gaps where the magnitude spikes have been removed.

In blocks 1508-1510, the processor determines replacement data points and includes the replacement data points in the combined time series. In some examples, the processor can determine the replacement data points using an exponential smoothing method. Additionally or alternatively, the processor can determine an average magnitude value based on the magnitudes of the data points proximate to a magnitude gap in the combined time series. The processor can then fill in the magnitude gap in the combined time series with the average magnitude value. The processor can repeat this process for some or all of the magnitude gaps. In other examples, the processor can use a predetermined magnitude value to fill in the magnitude gaps in the combined time series. The processor can use any number and combination of techniques to fill in the magnitude gaps in the combined time series.

In block 1512, the processor uses the smoothed time series as the time series. For example, the processor can overwrite the time series in memory with the smoothed time series, replace the time series in the time series group with the smoothed time series, store the smoothed time series in memory, or any combination of these.

Returning to FIG. 14, in block 1406, the processor determines if the time series exhibits a repetitive characteristic (e.g., a seasonal or periodic characteristic). For example, the processor can analyze the magnitudes of the time series to determine if a pattern or magnitudes exists that repeats at least once during the duration of the time series. In some examples, the processor can determine that the time series includes a particular pattern of magnitudes occurring on a daily, weekly, monthly, quarterly, or yearly cycle, or with another frequency. If the processor determines that the time series does not have the repetitive characteristic, the process can continue to block 1412. Otherwise, the process can continue to block 1408.

In block 1408, the processor determines the repetitive characteristic of the time series. For example, the processor can use classical time-series decomposition or other time-series decomposition methods on the time series to determine the repetitive characteristic of the time series. Time-series decomposition can be a statistical method in which a time series is deconstructed into several components, with each component representing an underlying pattern in the time series.

In block 1410, the processor generates an adjusted time series by removing the repetitive characteristic from the time series. For example, the processor can generate an adjusted time series by removing, from the original time series (e.g., received in block 1402), the repetitive characteristic.

In some examples, the processor can generated a group of adjusted time series by removing the repetitive characteristic from some or all of the time series in a time series group. For example, the processor can remove the repetitive characteristic from all of the time series in the time series group in which the original time series belongs, thereby generating a group of adjusted time series.

In blocks 1412-1414, the processor determines if the adjusted time series includes a moving event and, if so, determines an effect of the moving event on the adjusted time series. The effect of the moving event can include, for example, a magnitude spike; a magnitude dip; a pattern of magnitude spikes, dips, or both; an overall increase in the magnitudes in the adjusted time series; or any combination of these. In some examples, the processor can use a regression (e.g., linear regression) analysis or another type of statistical analysis on the adjusted time series to identify a moving event and determine the effect of the moving event on the adjusted time series.

In some examples, the processor can identify and determine the effect of a moving event across some or all of the adjusted time series in a group of adjusted time series. For example, the processor can perform one or more steps shown in FIG. 16 to determine an effect of a moving event on the group of adjusted time series.

Figure 16:
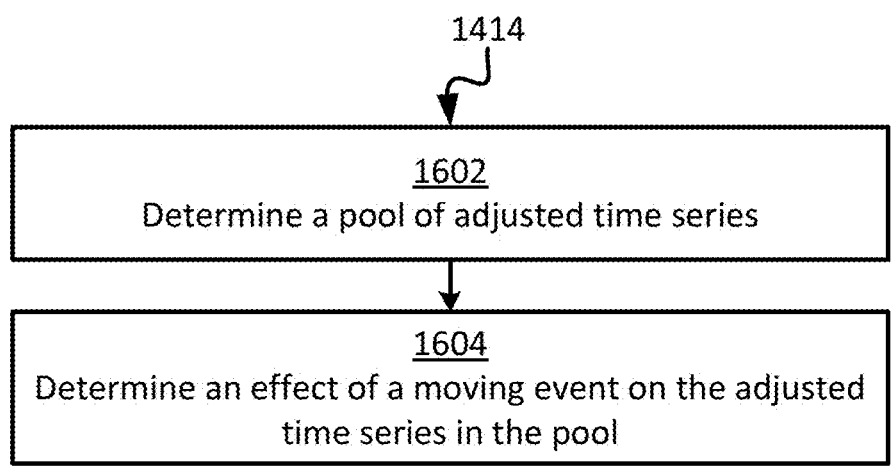
FIG. 16 is a flow chart of an example of a process for determining an effect of a moving event according to some aspects.

Turning to FIG. 16, in block 1602, the processor determines a pool (e.g., a subgroup) of adjusted time series from a larger group of adjusted time series. The larger group of adjusted time series can be the group of adjusted time series described with respect to block 1410. The processor can determine the pool of adjusted time series using a hierarchical method, time-series pattern clustering, or both of these. For example, the processor can analyze the magnitude patterns of some or all of the adjusted time series in the larger group and assemble or categorize the adjusted time series into pools having similar magnitude patterns.

In block 1604, the processor determines the effects of one or more moving events on the adjusted time series in the pool. The processor can use a regression analysis or another type of statistical analysis on the adjusted time series in the pool to determine an overall effect of the moving event across the adjusted time series in the pool. Analyzing a pool of adjusted time series can provide more accurate results than analyzing a single adjusted time-series, particularly if the single adjusted time-series spans a short duration or is noisy.

Returning to FIG. 14, in block 1416, the processor generates a residual time series by removing the effect of the moving event from the adjusted time series. A residual time series can be a form of the original time series that excludes the repetitive characteristic and the effect of the moving event. For example, the residual time series can be the resulting time series after the repetitive characteristic and the effect of the moving event are removed.

In some examples, the processor can remove the effect of the moving event from the adjusted time series by removing data points that corresponds to the moving event from the adjusted time series. For example, the processor can delete or otherwise remove some or all of the data points in the adjusted time series that correspond to the moving event.

In some examples, the processor can generated a group of residual time series by removing the effect(s) of the moving event(s) from some or all of the adjusted time series in a group of adjusted time series. For example, the processor can remove an effect of a moving event from all of the adjusted time series in the group of adjusted time series in which the original time series belongs, thereby generating a group of residual time series. As another example, the processor can remove an effect of a moving event from all of the adjusted time series in a pool of adjusted time series (e.g., the pool determined in block 1602 of FIG. 16), thereby generating a group of residual time series.

In block 1418, the processor generates a base model (e.g., a base forecast) using the residual time series. In some examples, the processor can generate the base model using univariate time-series modeling techniques. For example, the processor can generate the base model using an ARIMA model, an ARIMAX model, or an ESM.

The base model can represent interest in the object over a future period of time, such as one year. The duration of the future time period can be customizable by a user. For example, the processor can receive input indicating that the base model is to predict interest in the object over a longer future period of time, such as two years, and generate a base model that predicts the interest over that longer future period of time.

In some examples, the processor can use the base model as a predictive model to predict interest in the object over the future period of time for which the base model was generated. But the prediction can be more accurate if the processor includes the effect of the moving event, the repetitive characteristic, or both of these into the base model, as discussed below.

In block 1420, the processor includes the effect of the moving event (e.g., determined in block 1414) into the base model. For example, the processor can determine that a magnitude spike associated with Father's Day is to be included at a location in the base model corresponding to the date of Father's Day (or at multiple locations in the base model corresponding to the dates of Father's Day if the base model spans several years). The processor can then include the magnitude spike in the base model at the location. For example, the processor can increase the magnitude of a data point in the base model that corresponds to the date of Father's Day.

In some examples, the processor can include multiple effects associated with multiple moving events into the base model. For example, the processor can include the effects of promotions, company events, Easter, Father's Day, and Mother's Day into the base model. Including the effect(s) of one or more moving events in the base model can increase the accuracy of the base model.

In block 1422, the processor can include the repetitive characteristic into the base model. For example, the processor can include magnitude spikes or dips associated with the repetitive characteristic (e.g., determined in block 1408) into the base model. In one particular example, the processor can change the magnitudes of data points corresponding to dates associated with the repetitive characteristic to capture the effect of the repetitive characteristic. Including the effect(s) of the repetitive characteristic in the base model can increase the accuracy of the base model.

In some examples, after including the effect of the moving event, the repetitive characteristic, or both of these into the base model, the result can be a forecast that can provide an accurate prediction of interest in the object over a future period of time.

Example Implementation of the Three-Stage Process

Figure 17:
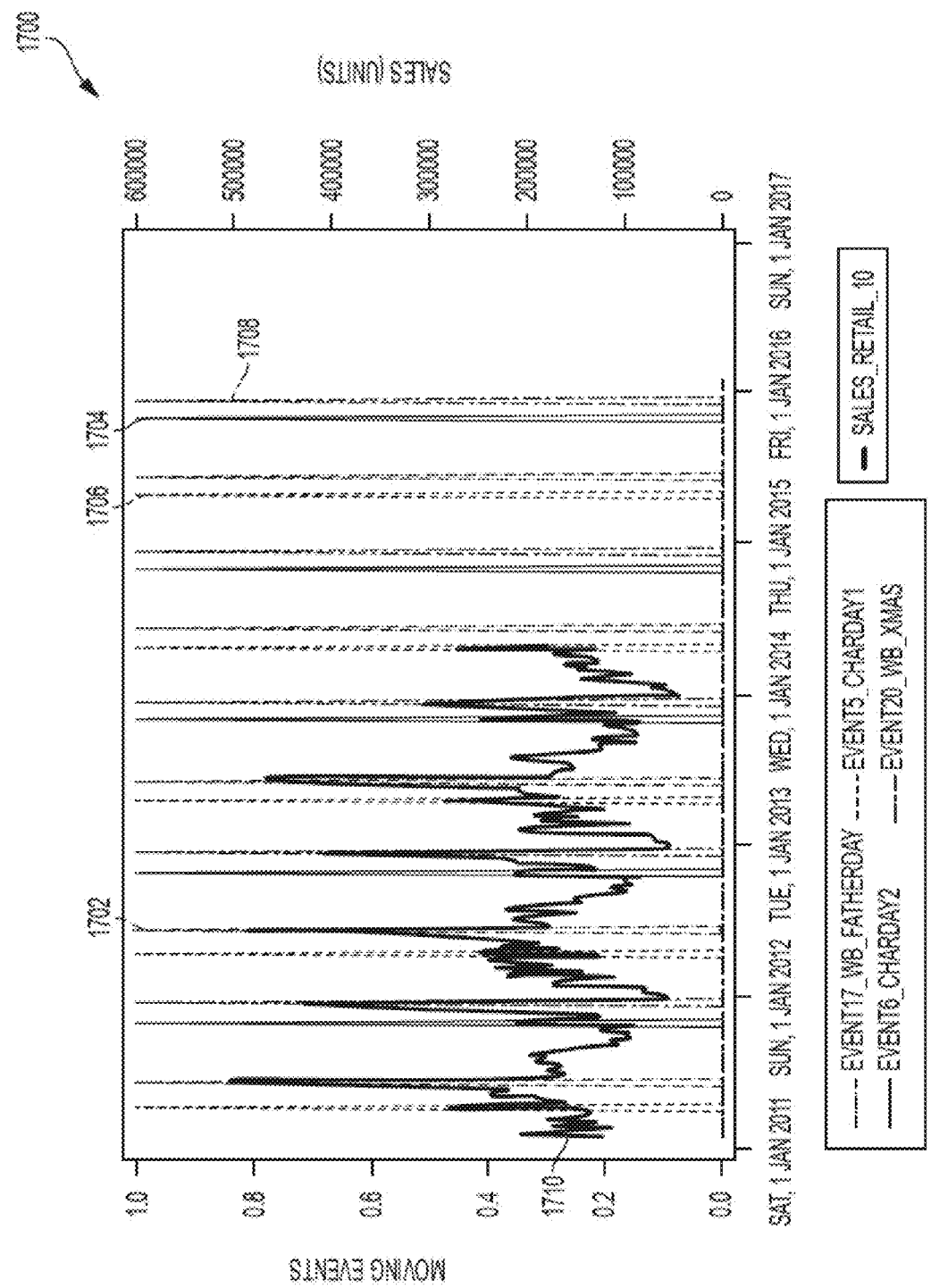
FIG. 17 is a graph of an example of time series data according to some aspects.

One example of the process described with respect to FIG. 14 being implemented is shown in FIGS. 17-25. FIG. 17 is a graph 1700 of an example of a time series 1710 according to some aspects. The time series 1710 represents sales data. The X-axis of the graph 1700 shows a timeframe between the years 2011 and 2017. The right Y-axis indicates a number of sales of a product (in units) during the timeframe. The left Y-axis indicates when moving events occur. A value of one indicates that a moving event occurred. Also shown on graph 1700 are various moving events that occur during the timeframe. For example, spike 1702 is associated with Father's Day. Spike 1708 is associated with Christmas. Spikes 1704, 1706 are associated with other holidays. Although all these moving events occur periodically throughout the timeframe (as represented by the periodic spikes), the moving events occur on different days of the week each year (e.g., Saturday in 2011, Sunday in 2012, Tuesday in 2013, etc.), which is why they are considered moving events.

Figure 18:
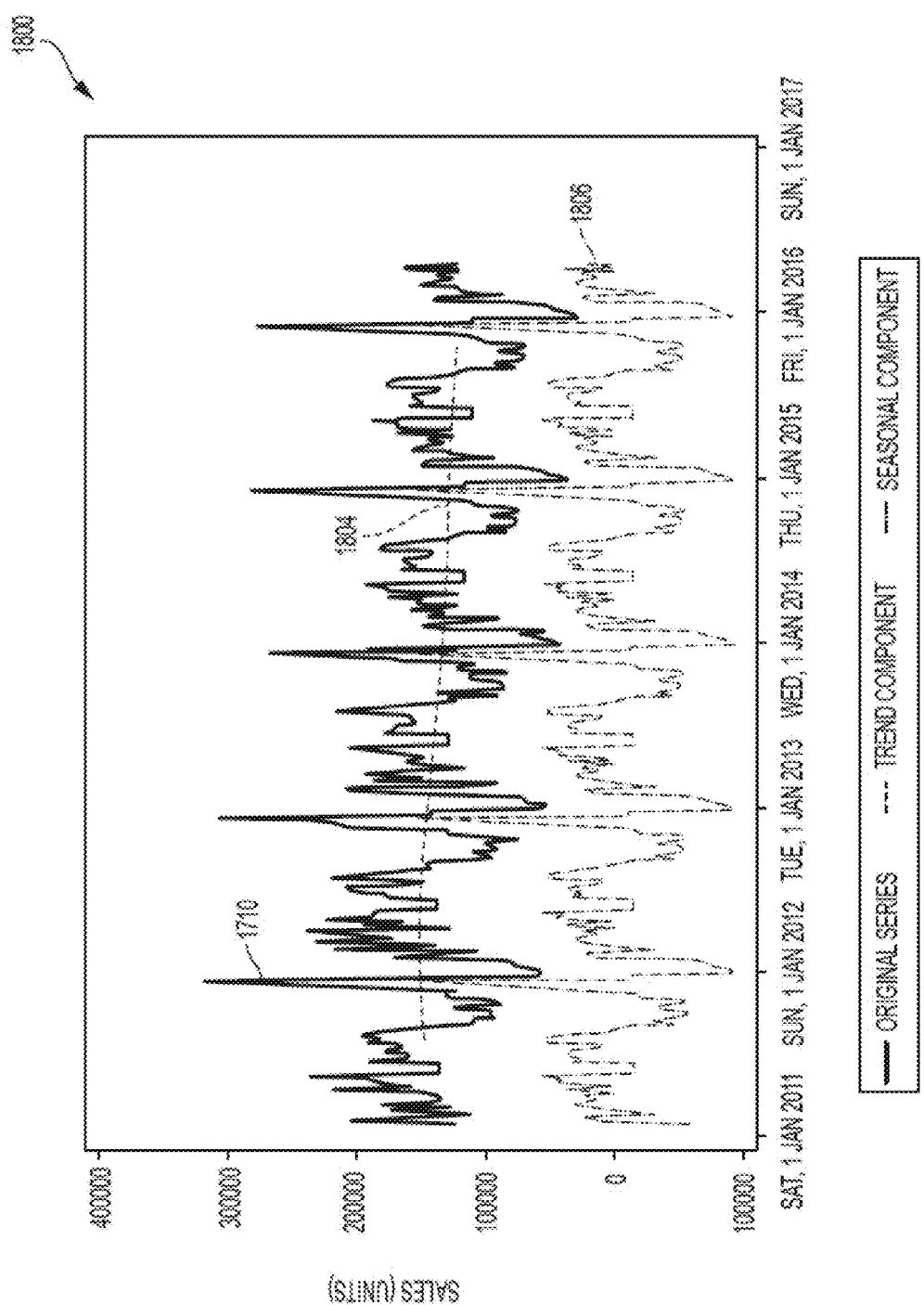
FIG. 18 is a graph of an example a decomposition of the time series from FIG. 17 after smoothing the time series according to some aspects.

FIG. 18 is a graph 1800 of an example of the decomposition of the time series 1710 from FIG. 17 after smoothing the time series according to some aspects. The graph 1800 shows the time series 1710, a seasonal component (e.g., repetitive characteristic) of the time series 1806, and a trend component 1804 of the time series. The trend component 1804 can indicate the long term trend or pattern in the time series over the timeframe. In this example, the trend component 1804 shows a long term decrease in sales over the timeframe.

Figure 19:
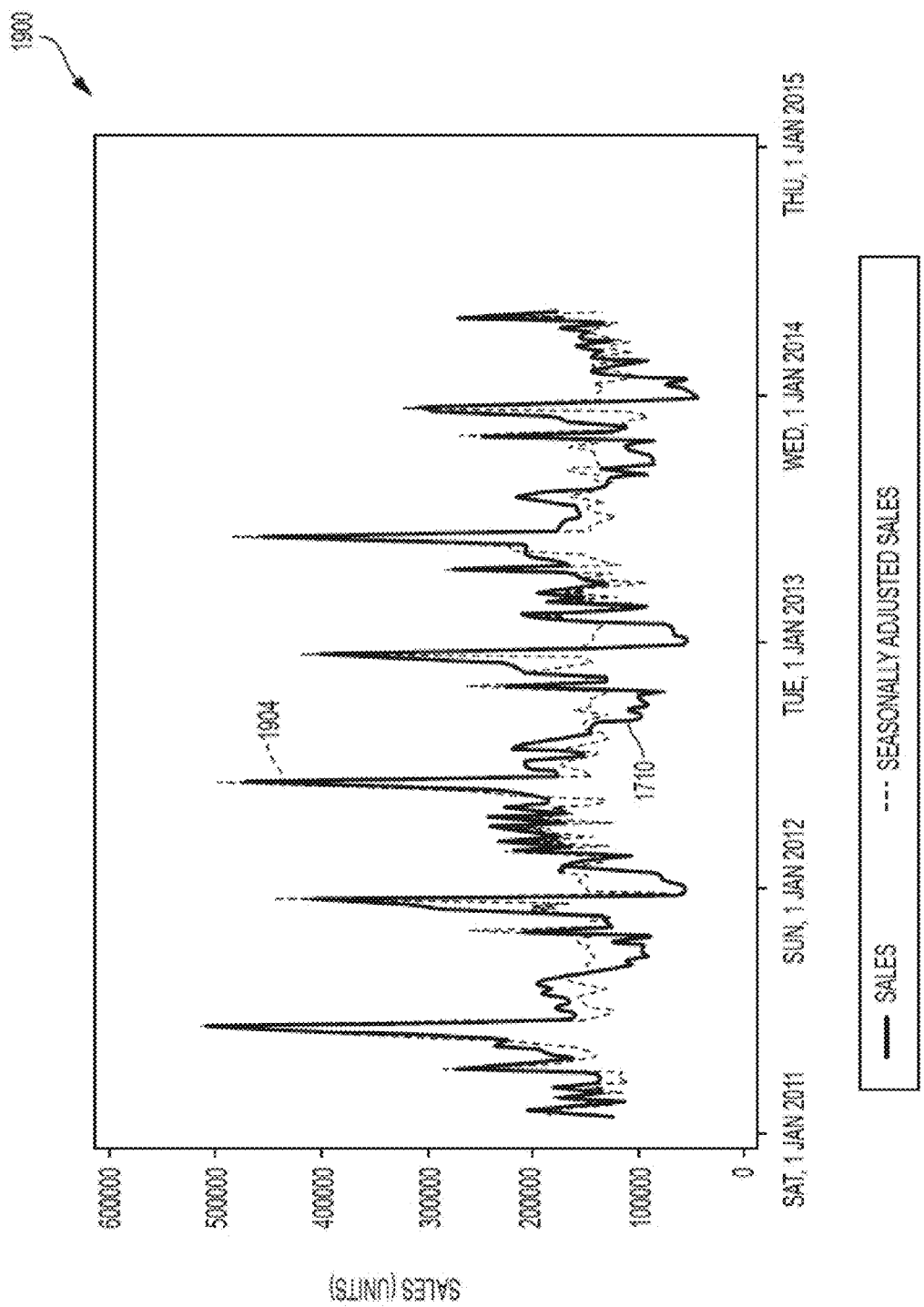
FIG. 19 is a graph of an example of the time series from FIG. 17 against a seasonally adjusted time series according to some aspects.

FIG. 19 is a graph 1900 of an example of the time series 1710 from FIG. 17 against a seasonally adjusted time series 1904 (e.g., a time series for which the repetitive characteristic has been removed) according to some aspects. As shown, the seasonally adjusted sales data has fewer drastic spikes and dips than the original sales data 1902. In some examples, the seasonally adjusted sales data can be the output from block 1410 of FIG. 14.

Figure 20:
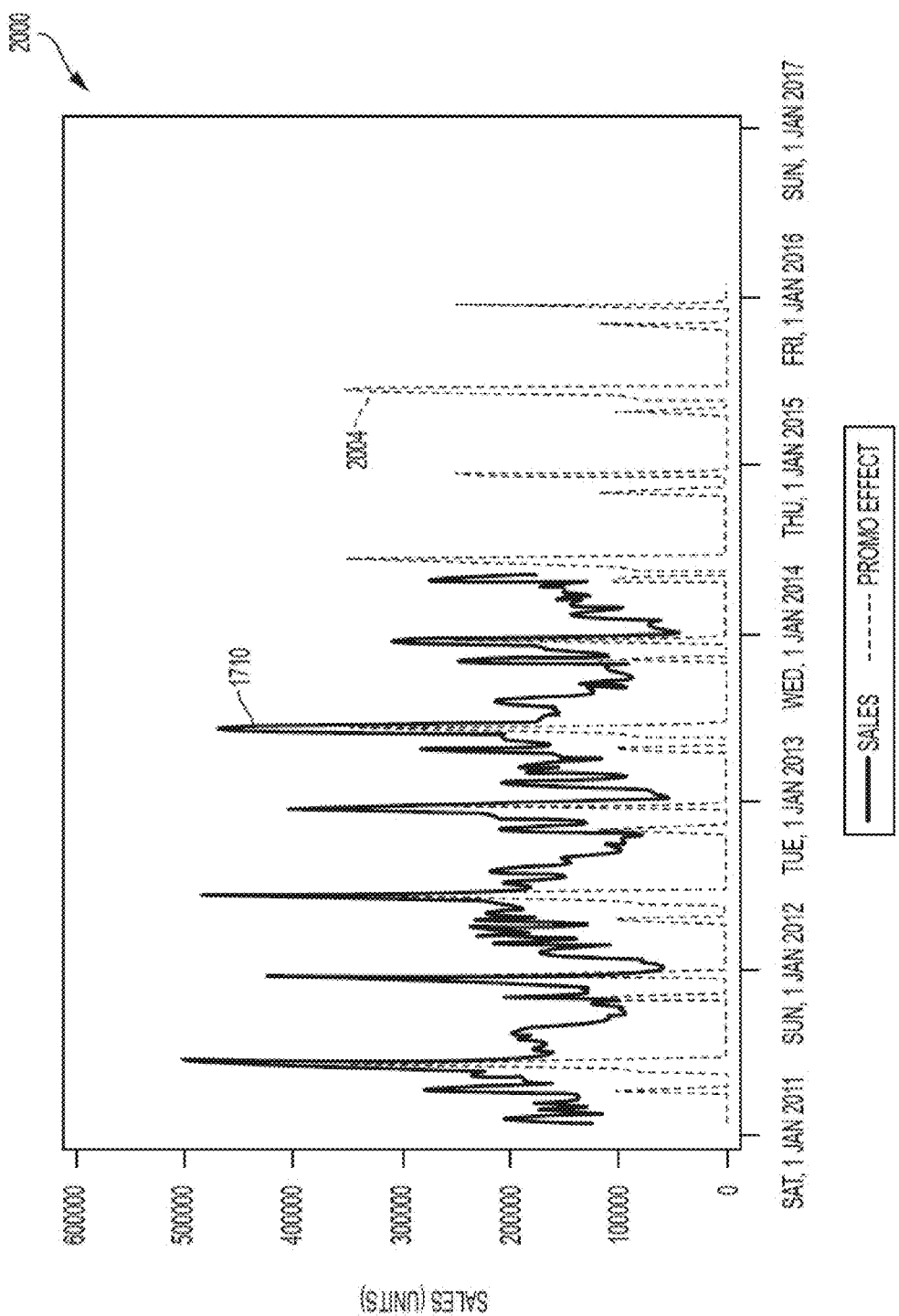
FIG. 20 is a graph of an example of the time series from FIG. 17 against the estimated effect of promotions on the time series according to some aspects.
Figure 21:
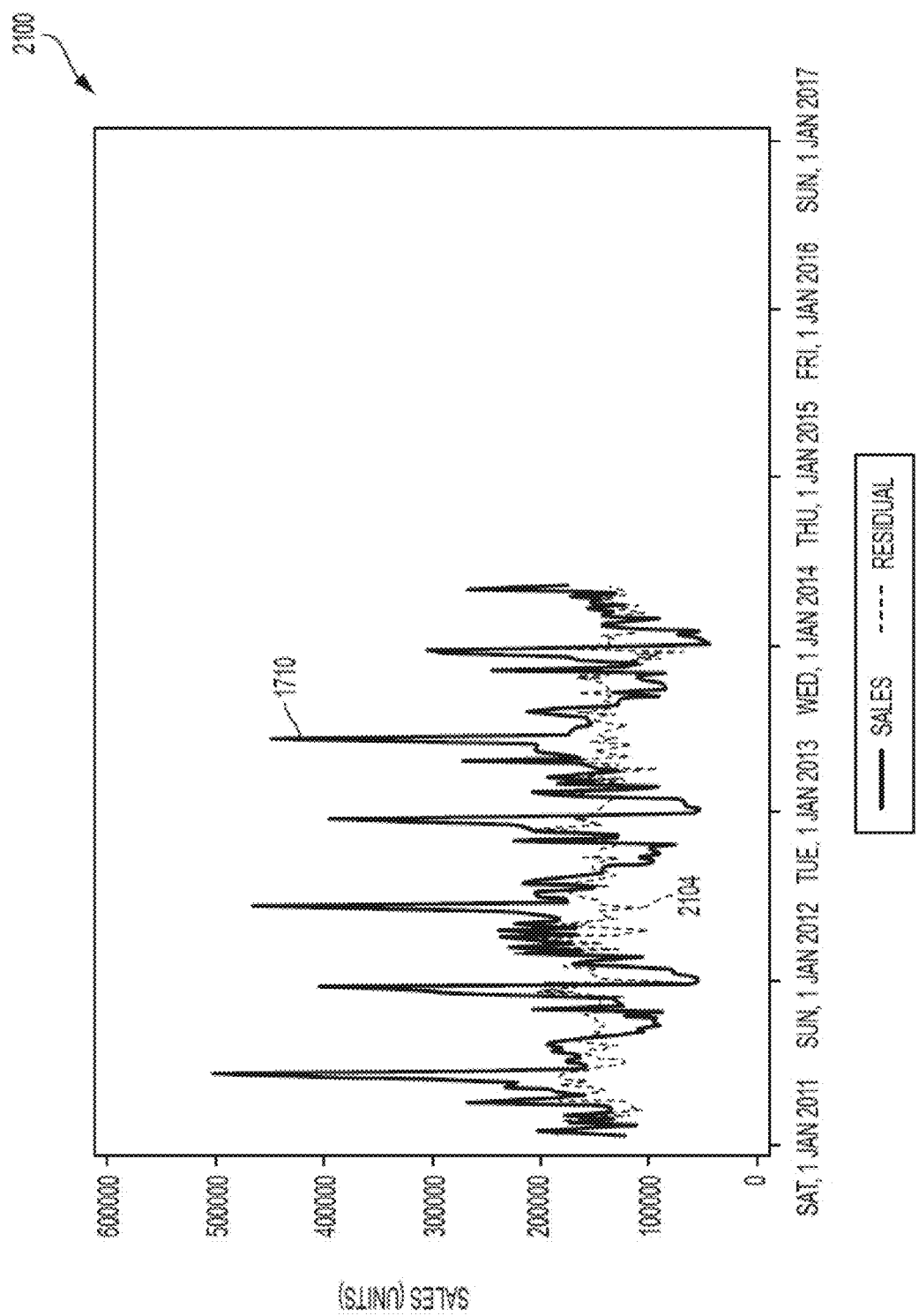
FIG. 21 is a graph of an example of the time series from FIG. 17 against a residual time series after the effects of the promotions have been removed according to some aspects.

FIG. 20 is a graph 2000 of an example of the time series 1710 from FIG. 17 against the estimated effect of promotions (e.g., the effects of moving events) on the time series according to some aspects. FIG. 21 is a graph 2100 of an example of the time series 1710 from FIG. 17 against a residual time series 2104 after the effects of the promotions have been removed according to some aspects. In some examples, the residual time series 2104 can be the output from block 1416 of FIG. 14.

Figure 22:
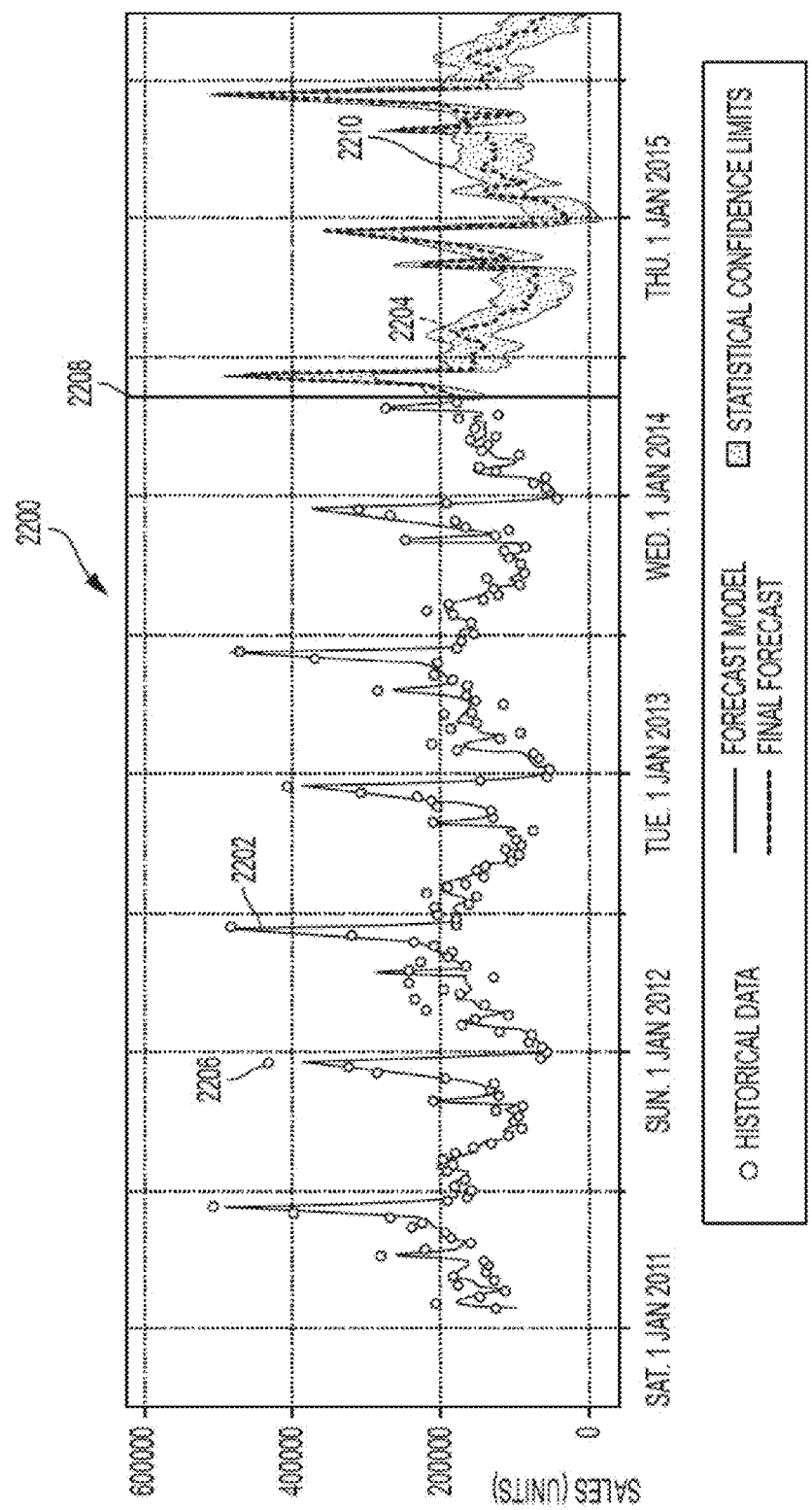
FIG. 22 is a graph of an example of a final forecast according to some aspects.

FIG. 22 is a graph 2200 of an example of a final forecast according to some aspects. The final forecast can be generated by performing the steps shown in blocks 1418-1422 of FIG. 14. The points 2206 to the left of the bar 2208 show the original time-series data. Line 2202 can be a base model (e.g., generated in block 1418 of FIG. 14). Line 2204 can be a final model (e.g., a final forecast generated in block 1422 of FIG. 14). The shading surrounding the line 2204 can represent the statistical confidence limits for the final model. As shown, the final model can accurately predict sales through the year 2015.

Figure 23:
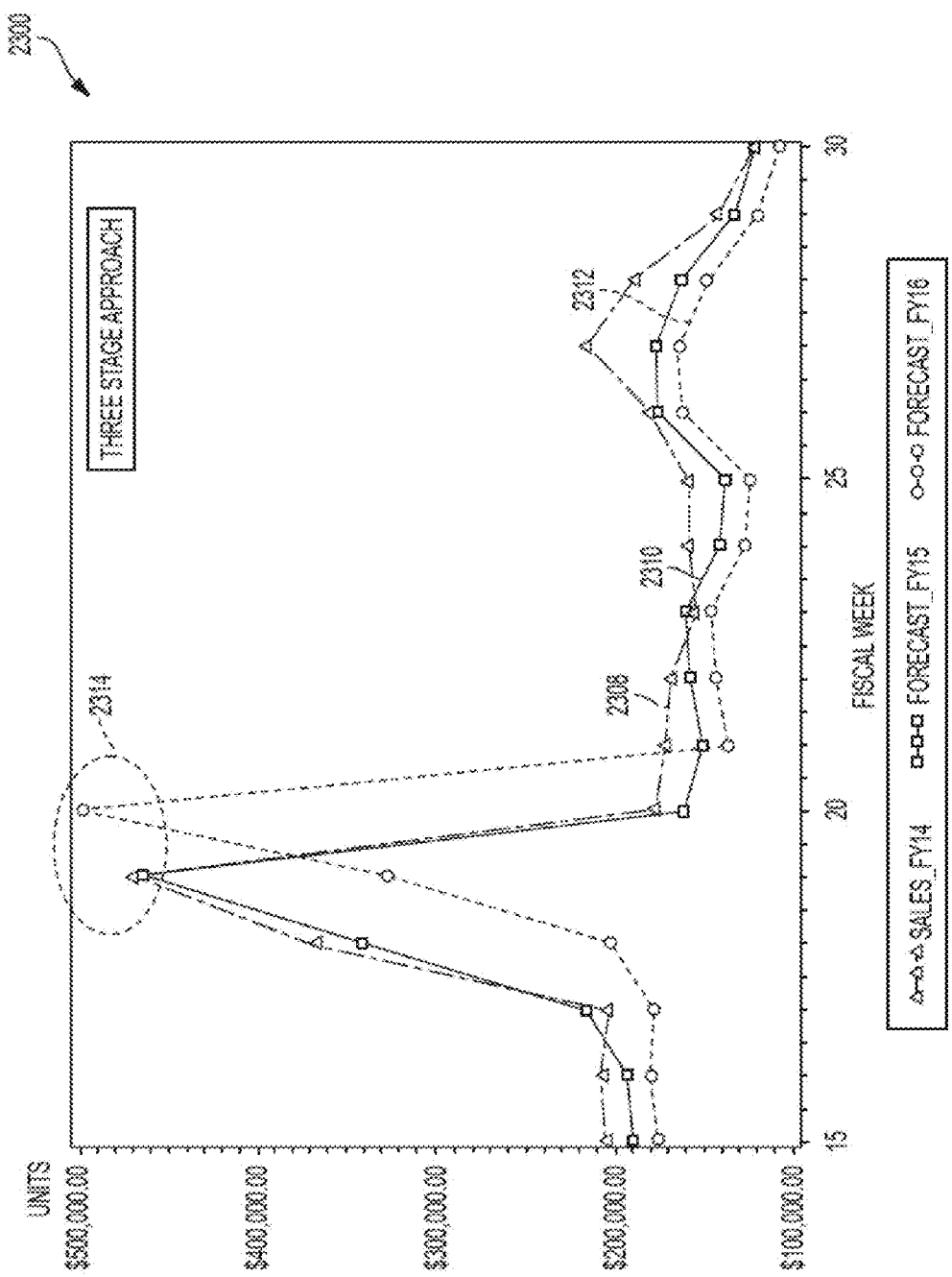
FIG. 23 is a graph of an example of actual sales against predicted sales generated using the three-stage process according to some aspects.

Predictions generated using the three-stage process shown in FIG. 14 can be more accurate than predictions generated using other processes. For example, FIG. 23 is a graph 2300 of an example of actual sales against predicted sales generated using the three-stage process according to some aspects. Line 2308 shows actual sales during the year 2014, line 2310 shows actual sales during the year 2015, and line 2312 shows predicted sales during the year 2016. As shown, lines 2308 and 2310 include a magnitude spike around fiscal week 19. Line 2312 includes a magnitude spike around fiscal week 20. These magnitude spikes can correspond to a spike in sales during the week before Father's Day. Because Father's Day shifted from fiscal week 19 in the years 2014-2015 to fiscal week 20 in the year 2016, the predicted sales shown by line 2312 accurately reflect this shift.

Figure 24:
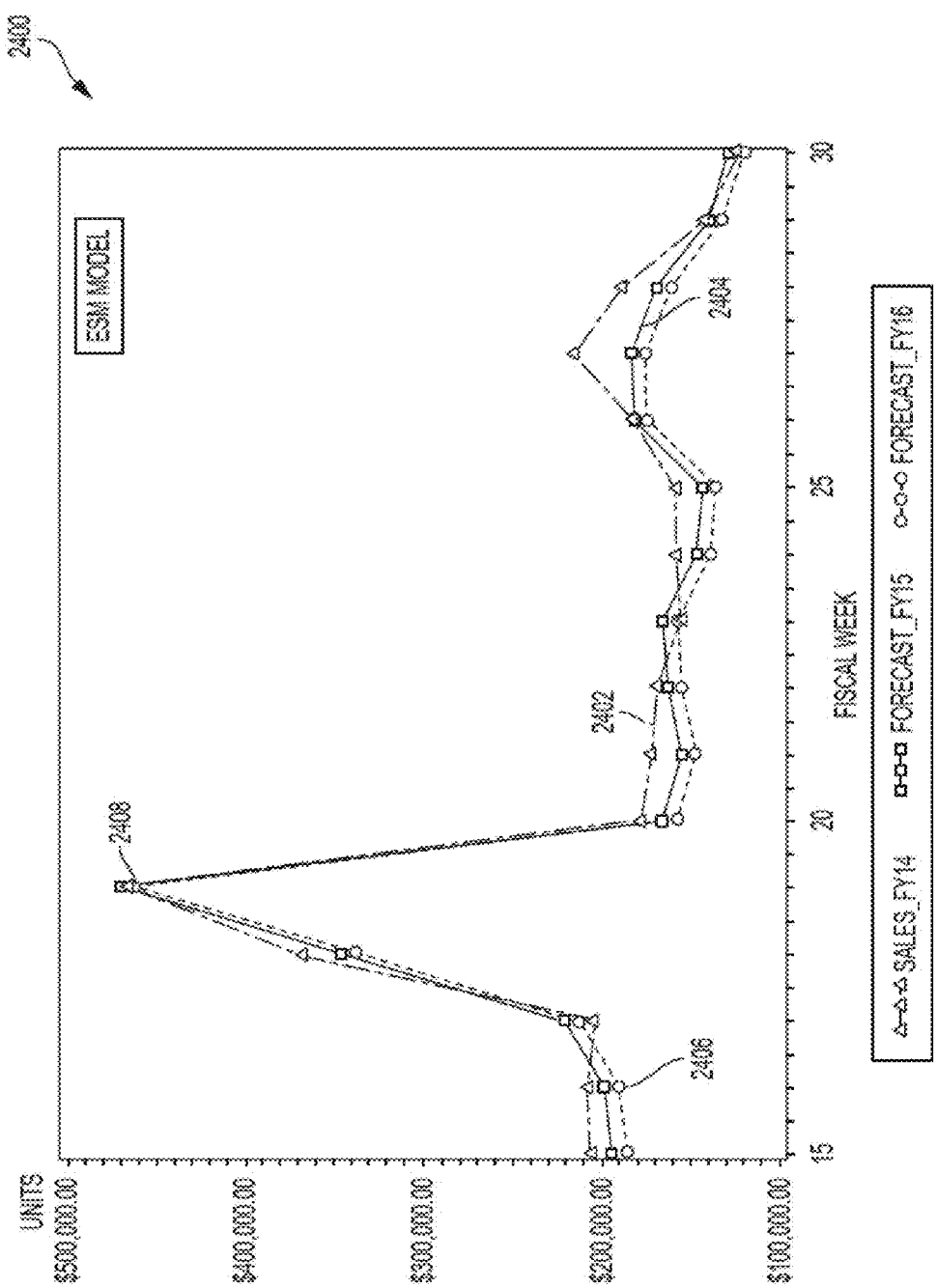
FIG. 24 is a graph of an example of actual sales against predicted sales generated using an exponential smoothing model according to some aspects.

Conversely, other processes may fail to capture moving events or otherwise may be less accurate. For example, FIG. 24 is a graph 2400 that includes line 2402 showing actual sales during the year 2014, line 2404 showing actual sales during the year 2015, and line 2406 showing predicted sales during the year 2016. The predicted sales were generated using an ESM model. As shown by the alignment of peaks 2408, the predicted sales during the year 2016 align with the actual sales from the previous years, failing take into account the shift for Father's Day from fiscal week 19 to fiscal week 20.

Figure 25:
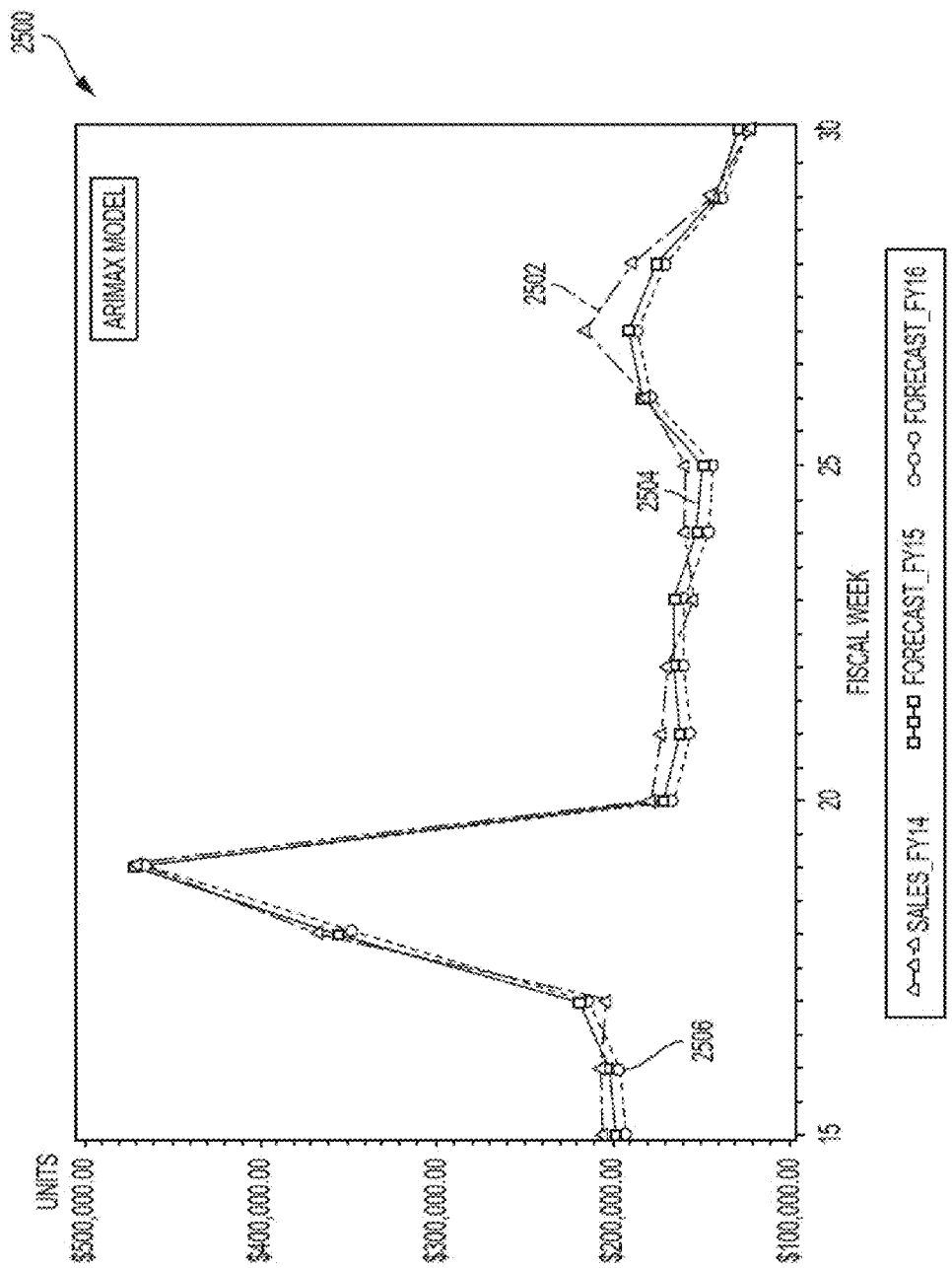
FIG. 25 is a graph of an example of actual sales against predicted sales generated using an autoregressive integrated moving average model according to some aspects.

As another example, FIG. 25 shows a graph 2500 that includes a line 2502 showing actual sales during the year 2014, line 2504 showing actual sales during the year 2015, and line 2406 showing predicted sales during the year 2016. The predicted sales were generated using an ARIMAX model. As shown, predicted sales during the year 2016 align with the actual sales from the previous years, failing take into account the shift for Father's Day from fiscal week 19 to fiscal week 20.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A non-transitory computer readable medium comprising program code executable by a processor to:
  receive a plurality of time series comprising a plurality of data points arranged in a sequential order over a period of time;
  determine a subset of data points in the plurality of data points, the subset of data points being associated with a moving event that occurs on different dates for at least two consecutive years;
  generate a plurality of base time series by removing the subset of data points from the plurality of time series;
  smooth the plurality of base time series to generate smoothed versions of the plurality of base time series;
  combine the smoothed versions of the plurality of base time series into an aggregate time series;
  determine a seasonal characteristic of the aggregate time series by decomposing the aggregate time series, the seasonal characteristic being a repetitive characteristic that repeats over a predetermined time period;
  generate a plurality of adjusted time series by removing the seasonal characteristic from the plurality of time series;
  determine, using the plurality of adjusted time series, an effect of one or more moving events on the plurality of adjusted time series;
  generate at least one residual time series by removing the effect of the one or more moving events from at least one adjusted time series in the plurality of adjusted time series;
  generate, using the at least one residual time series, at least one base forecast that is independent of the seasonal characteristic and the effect of the one or more moving events;
  generate at least one predictive forecast by including the seasonal characteristic and the effect of the one or more moving events into the at least one base forecast, the predictive forecast indicating interest in a product over a future period of time; and
  predict, using the at least one predictive forecast, interest in the product over the future period of time.

2. The non-transitory computer readable medium of claim 1, further comprising program code executable by the processor to pre-process at least one time series in the plurality of time series by:
  determining that the least one time series is to be combined with another time series based on a length of the at least one time series being below a threshold; and
  generating combined time-series by combining the at least one time series with the other time series.

3. The non-transitory computer readable medium of claim 1, further comprising program code executable by the processor for causing the processor to smooth the plurality of base time series by:
  determining replacement data points to be included in the plurality of base time series in locations corresponding to the subset of data points that were removed from the plurality of time series; and
  including the replacement data points in the plurality of base time series in the locations corresponding to the subset of data points that were removed from the plurality of time series.

4. The non-transitory computer readable medium of claim 1, further comprising program code executable by the processor to determine the plurality of time series using a clustering method or a hierarchical method.

5. The non-transitory computer readable medium of claim 1, further comprising program code executable by the processor to determine that the plurality of time series is usable to generate the predictive forecast prior to determining the subset of data points associated with the moving event by:
  receiving a group of time series comprising the plurality of time series; and
  filtering the group of time series using a threshold time duration to identify a subset of time series having time durations that exceed the threshold time duration, the subset of time series being the plurality of time series.

6. The non-transitory computer readable medium of claim 1, further comprising program code executable by the processor to, prior to determining the subset of data points associated with the moving event:
  determine that the plurality of time series does not include a time period with inactivity; and
  determine that the time series exhibits the seasonal characteristic by analyzing the time series to detect a presence of the seasonal characteristic.

7. The non-transitory computer readable medium of claim 1, further comprising program code executable by the processor to, prior to determining the subset of data points associated with the moving event, determine that the plurality of time series comprises a magnitude spike with a value above a magnitude threshold.

8. The non-transitory computer readable medium of claim 1, further comprising program code executable by the processor to flag the plurality of time series as compatible with a process for generating the predictive forecast prior to generating the predictive forecast.

9. A method comprising:
  receiving, by a processing device, a plurality of time series comprising a plurality of data points arranged in a sequential order over a period of time;
  determining, by the processing device, a subset of data points in the plurality of data points, the subset of data points being associated with a moving event that occurs on different dates for at least two consecutive years;
  generating, by the processing device, a plurality of base time series by removing the subset of data points from the plurality of time series;
  smoothing, by the processing device, the plurality of base time series to generate smoothed versions of the plurality of base time series;
  combining, by the processing device, the smoothed versions of the plurality of base time series into an aggregate time series;
  determining, by the processing device, a seasonal characteristic of the aggregate time series by decomposing the aggregate time series, the seasonal characteristic being a repetitive characteristic that repeats over a predetermined time period;
  generating, by the processing device, a plurality of adjusted time series by removing the seasonal characteristic from the plurality of time series;
  determining, by the processing device and using the plurality of adjusted time series, an effect of one or more moving events on the plurality of adjusted time series;
  generating, by the processing device, at least one residual time series by removing the effect of the one or more moving events from at least one adjusted time series in the plurality of adjusted time series;
  generating, by the processing device and using the at least one residual time series, at least one base forecast that is independent of the seasonal characteristic and the effect of the one or more moving events;

generating, by the processing device, at least one predictive forecast by including the seasonal characteristic and the effect of the one or more moving events into the at least one base forecast, the predictive forecast indicating interest in a product over a future period of time; and predicting, by the processing device and using the at least one predictive forecast, interest in the product over the future period of time.

10. The method of claim 9, further comprising pre-processing at least one time series in the plurality of time series by:

determining that the least one time series is to be combined with another time series based on a length of the at least one time series being below a threshold; and generating a combined time-series by combining the at least one time series with the other time series.

11. The method of claim 9, further comprising smoothing the plurality of base time series by:

determining replacement data points to be included in the plurality of base time series in locations corresponding to the subset of data points that were removed from the plurality of time series; and including the replacement data points in the plurality of base time series in the locations corresponding to the subset of data points that were removed from the plurality of time series.

12. The method of claim 9, further comprising determining the plurality of time series using a clustering method or a hierarchical method.

13. The method of claim 9, further comprising determining that the plurality of time series is usable to generate the predictive forecast prior to determining the subset of data points associated with the moving event by:

receiving a group of time series comprising the plurality of time series; and filtering the group of time series using a threshold time duration to identify a subset of time series having time durations that exceed the threshold time duration, the subset of time series being the plurality of time series.

14. The method of claim 9, further comprising, prior to determining the subset of data points associated with the moving event:

determining that the plurality of time series does not include a time period with inactivity; and determining that the time series exhibits the seasonal characteristic by analyzing the time series to detect a presence of the seasonal characteristic.

15. The method of claim 9, further comprising, prior to determining the subset of data points associated with the moving event, determining that the plurality of time series comprises a magnitude spike with a value above a magnitude threshold.

16. The method of claim 9, further comprising flagging the time series as compatible with a processor for generating the predictive forecast prior to generating the predictive forecast.

17. The system of claim 9, wherein the memory device further comprises instructions executable by the processing device to, prior to determining the subset of data points associated with the moving event:

determine that the plurality of time series does not include a time period with inactivity; and determine that the time series exhibits the seasonal characteristic by analyzing the time series to detect a presence of the seasonal characteristic.

18. The system of claim 9, wherein the memory device further comprises instructions executable by the processing device to, prior to determining the subset of data points associated with the moving event, determine that the plurality of time series comprises a magnitude spike with a value above a magnitude threshold.

19. A system comprising:

a processing device; and a memory device in which instructions executable by the processing device are stored for causing the processing device to:

receive a plurality of time series comprising a plurality of data points arranged in a sequential order over a period of time;

determine a subset of data points in the plurality of data points, the subset of data points being associated with a moving event that occurs on different dates for at least two consecutive years;

generate a plurality of base time series by removing the subset of data points from the plurality of time series;

smooth the plurality of base time series to generate smoothed versions of the plurality of base time series;

combine the smoothed versions of the plurality of base time series into an aggregate time series;

determine a seasonal characteristic of the aggregate time series by decomposing the aggregate time series, the seasonal characteristic being a repetitive characteristic that repeats over a predetermined time period;

generate a plurality of adjusted time series by removing the seasonal characteristic from the plurality of time series;

determine, using the plurality of adjusted time series, an effect of one or more moving events on the plurality of adjusted time series;

generate at least one residual time series by removing the effect of the one or more moving events from at least one adjusted time series in the plurality of adjusted time series;

generate, using the at least one residual time series, at least one base forecast that is independent of the seasonal characteristic and the effect of the one or more moving events;

generate at least one predictive forecast by including the seasonal characteristic and the effect of the one or more moving events into the at least one base forecast, the predictive forecast indicating interest in a product over a future period of time; and predict, using the at least one predictive forecast, interest in the product over the future period of time.

20. The system of claim 19, wherein the memory device further comprises instructions executable by the processing device to pre-process at least one time series in the plurality of time series by:

determining that the least one time series is to be combined with another time series based on a length of the at least one time series being below a threshold; and generating a combined time-series by combining the at least one time series with the other time series.

21. The system of claim 19, wherein the memory device further comprises instructions executable by the processing device to smooth the plurality of base time series by:

determining replacement data points to be included in the plurality of base time series in locations corresponding to the subset of data points that were removed from the plurality of time series; and including the replacement data points in the plurality of base time series in the locations corresponding to the subset of data points that were removed from the plurality of time series.

22. The system of claim 19, wherein the memory device further comprises instructions executable by the processing device to determine the plurality of time series using a clustering method or a hierarchical method.

23. The system of claim 19, wherein the memory device further comprises instructions executable by the processing device to determine that the plurality of time series is usable to generate the predictive forecast prior to determining the subset of data points associated with the moving event by:
receiving a group of time series comprising the plurality of time series; and
filtering the group of time series using a threshold time duration to identify a subset of time series having time durations that exceed the threshold time duration, the subset of time series being the plurality of time series.

24. The system of claim 18, wherein the memory device further comprises instructions executable by the processing device to flag the plurality of time series as compatible with a process for generating the predictive forecast prior to generating the predictive forecast.

* * * * *